(12) United States Patent
Ikeda et al.

(10) Patent No.: US 8,595,247 B2
(45) Date of Patent: Nov. 26, 2013

(54) TEXT MINING DEVICE, TEXT MINING METHOD, AND TEXT MINING PROGRAM

(75) Inventors: Takahiro Ikeda, Tokyo (JP); Yoshihiro Ikeda, legal representative, Chiba (JP); Satoshi Nakazawa, Tokyo (JP); Yousuke Sakao, Tokyo (JP); Kenjo Satoh, Tokyo (JP)

(73) Assignee: NEC Corporation, Tokyo (JP)

( * ) Notice: Subject to any disclaimer, the term of this patent is extended or adjusted under 35 U.S.C. 154(b) by 508 days.

(21) Appl. No.: 12/227,696

(22) PCT Filed: May 17, 2007

(86) PCT No.: PCT/JP2007/060133
§ 371 (c)(1),
(2), (4) Date: Nov. 25, 2008

(87) PCT Pub. No.: WO2007/138872
PCT Pub. Date: Jun. 12, 2007

(65) Prior Publication Data
US 2009/0307210 A1    Dec. 10, 2009

(30) Foreign Application Priority Data
May 26, 2006    (JP) .................................. 2006-147038

(51) Int. Cl.
*G06F 17/30* (2006.01)
(52) U.S. Cl.
USPC .......................................... 707/758; 707/722
(58) Field of Classification Search
USPC ................................................ 707/758, 722
See application file for complete search history.

(56) References Cited

U.S. PATENT DOCUMENTS

| 2002/0099730 A1* | 7/2002 | Brown et al. .................. 707/500 |
| 2007/0016580 A1* | 1/2007 | Mann et al. ........................ 707/6 |

FOREIGN PATENT DOCUMENTS

| JP | 2002-041547 A | 2/2002 |
| JP | 2002-092004 A | 3/2002 |
| JP | 2003-141134 A | 5/2003 |
| JP | 2003-308417 A | 10/2003 |
| JP | 2004-021445 A | 1/2004 |

OTHER PUBLICATIONS

T. Nasugawa, "Text Mining Application for Call Centers," Journal of Japanese Society for Artificial Intelligence, Mar. 1, 2001, vol. 16:2, pp. 219-225.
Fujitsu SymfoWARER Navigator Server Shinkino Goshokai, Mar. 31, 2002, First Edition, pp. 39-50.
M. Kawahara, "Data Mining Technologies for Bibliographic Navigation System," Transactions of Information Processing Society of Japan, Apr. 15, 1998, vol. 39:4, pp. 878-887.

* cited by examiner

*Primary Examiner* — Amresh Singh
(74) *Attorney, Agent, or Firm* — Foley & Lardner LLP

(57) ABSTRACT

Provided is a text mining device capable of showing a user whether the characteristics extracted by a text mining are either common to all texts independently of the citations, in case the text to be mined is configured with texts of a plurality of kinds of different citations, or deviated toward a text of a predetermined citation. The text mining device includes a citation information creating device for creating the citation information of texts containing characteristics extracted from a text set collected from a plurality of citations, and a mining result output device for outputting the characteristics and the citation information in a corresponding manner.

3 Claims, 27 Drawing Sheets

FIG. 12

| CITATION = E-MAIL | | | | |
|---|---|---|---|---|
| D1 | D2 | D3 | D4 | ⋮ |
| I HAVE PURCHASED TV-100, BUT NOTHING COMES OUT EVEN AFTER TURNING ON THE POWER. MIGHT BE INITIAL DEFECTS ? ...... | I AM PLANNING TO PURCHASE A LIQUID CRYSTAL TV. WHAT IS THE DIFFERENCE BETWEEN TV-100 AND TV-200 ? ............ | I PURCHASED TV-100 YESTERDAY AND AM VERY PLEASED WITH THE PRODUCT. HOWEVER, THERE ARE FLICKERS OBSERVED ON THE SCREEN SOMETIMES... | TV-100 DOES NOT GET TURNED ON. PRECISELY, IT TURNS ON FOR A MOMENT, BUT IMMEDIATELY IS SHUT OFF.... | ...... |

| CITATION = TELEPHONE | | | | |
|---|---|---|---|---|
| D101 | D102 | D103 | D104 | ⋮ |
| IS IT POSSIBLE TO WASH (WATCH) TERRESTRIAL DIGITAL ONLY WITH TV-100 OR SEED (NEED) TO HI (BUY) SOMETHING IN ADDITION ? ·· | THE TV I BOUGHT YESTERDAY DOES NOT GET TORN (TURNED) ON. THE PRODUCT SHAME (NAME) IS TV-100.............. | I WOULD LIKE TO MIND (FIND) THE CLOSEST STORE THAT SELLS TV-100. WOULD YOU TELL ME ?...... | THE SCREAM (SCREEN) REMAINS DARK EVEN AFTER TURNING ON THE SHOWER (POWER). THE MOLE (MODEL) IS TV-100. MAY THERE BE A FAULT ? ............ | ...... |

FIG. 13

| CATEGORY | TEXT |
|---|---|
| FAULT | D1,D3,D4,D7,D9,D10,D11,D15,D23,D24,D31,... <br> : <br> D102,D104,D107,D121,D123,D126,D127,D131,... <br> : |
| INQUIRY | D2,D12,D17,D27,D28,D33,D34,D42,D44,D51,... |
| REQUEST | D5,D8,D18,D19,D20,D29,D35,D43,D45,D49,... |
| : | : |

FIG. 14

| CHARACTERISTIC | TEXTS CONTAINING CHARACTERISTIC |
|---|---|
| POWER SUPPLY | D1,D4,D9,D107,D127 |
| SCREEN | D3,D10,D123,D126 |
| INSPECTION | D102,D104,D121 |
| REMOTE CONTROLLER | D7,D11,D16,D131 |
| ⋮ | ⋮ |

FIG. 15

| CHARACTERISTIC | MAIN CITATION |
|---|---|
| POWER SUPPLY | NONE |
| SCREEN | NONE |
| INSPECTION | TELEPHONE |
| REMOTE CONTROLLER | E-MAIL |
| ⋮ | ⋮ |

FIG. 16

| CHARACTERISTIC | PROPORTION OF CITATIONS |
|---|---|
| POWER SUPPLY | |
| SCREEN | |
| INSPECTION | |
| REMOTE CONTROLLER | |
| ⋮ | ⋮ |

NOTES
▨ E-MAIL
▦ TELEPHONE

FIG. 17

| CHARACTERISTIC | PECULIAR CITATION |
|---|---|
| POWER SUPPLY | NONE |
| SCREEN | TELEPHONE |
| INSPECTION | TELEPHONE |
| REMOTE CONTROLLER | NONE |
| ⋮ | ⋮ |

FIG. 18

| CHARACTERISTIC | DIVERGENCE DEGREES IN THE NUMBER OF TEXTS |
|---|---|
| POWER SUPPLY | |
| SCREEN | |
| INSPECTION | |
| REMOTE CONTROLLER | |
| ⋮ | ⋮ |

NOTES
▨ E-MAIL
▦ TELEPHONE

| CLASSIFICATION AXES | CATEGORIES | | | | | | |
|---|---|---|---|---|---|---|---|
| INTERESTS IN PRODUCT | INTERESTED 630 | | | NOT INTERESTED 170 | | | |
| SEX | FEMALE 384 | | | MALE 416 | | | |
| AGE | 20's 310 | | 30's 252 | | 40's 144 | | 50's 94 |
| OCCUPATION | STUDENT 164 | COMPANY EMPLOYEE 315 | | HOUSEWIFE 235 | | OTHERS 86 | |

FIG. 20

| TEXT | INTERESTS IN PRODUCT | CLASSIFICATION AXES | | |
|---|---|---|---|---|
| | | SEX | AGE | OCCUPATION |
| D1 | INTERESTED | FEMALE | 20's | STUDENT |
| D2 | NOT INTERESTED | FEMALE | 30's | HOUSEWIFE |
| D3 | NOT INTERESTED | MALE | 50's | OTHERS |
| D4 | INTERESTED | FEMALE | 20's | COMPANY EMPLOYEE |
| .. | .. | .. | .. | .. |
| D800 | INTERESTED | MALE | 40's | COMPANY EMPLOYEE |

FIG. 21

| CHARACTERISTIC | TEXTS CONTAINING CHARACTERISTIC |
|---|---|
| PERFORMANCE | D3,D20,D22,D23,D30,... |
| DESIGN | D1,D4,D7,D20,D25,... |
| PRICE | D1,D4,D15,D16,D17,... |
| SIZE | D2,D5,D9,D13,D17,... |
| : | : |

FIG. 22

| CHARACTERISTIC | CATEGORIES OF CLASSIFICATION AXIS "SEX" ||
|---|---|---|
| | FEMALE | MALE |
| PERFORMANCE | 132 | 151 |
| DESIGN | 151 | 103 |
| PRICE | 102 | 122 |
| SIZE | 84 | 71 |
| : | : | : |

FIG. 23

| CHARACTERISTIC | CATEGORIES OF CLASSIFICATION AXIS "AGE" | | | |
|---|---|---|---|---|
| | 20's | 30's | 40's | 50's |
| PERFORMANCE | 114 | 88 | 54 | 27 |
| DESIGN | 115 | 74 | 40 | 25 |
| PRICE | 98 | 65 | 43 | 18 |
| SIZE | 60 | 52 | 33 | 10 |
| ⋮ | ⋮ | ⋮ | ⋮ | ⋮ |

FIG. 24

| CHARACTERISTIC | CATEGORIES OF CLASSIFICATION AXIS "OCCUPATION" | | | |
| --- | --- | --- | --- | --- |
| | STUDENT | COMPANY EMPLOYEE | HOUSEWIFE | OTHERS |
| PERFORMANCE | 58 | 120 | 73 | 32 |
| DESIGN | 52 | 89 | 84 | 29 |
| PRICE | 65 | 72 | 70 | 17 |
| SIZE | 28 | 74 | 40 | 13 |
| : | : | : | : | : |

FIG. 26

|  | CATEGORIES OF CLASSIFICATION AXIS "SEX" ||
| --- | --- | --- |
|  | FEMALE | MALE |
| CHARACTERISTIC "PERFORMANCE" CONTAINED | 135.84 | 147.16 |
| CHARACTERISTIC "PERFORMANCE" NOT CONTAINED | 248.16 | 268.84 |

FIG. 27

| CHARACTERISTIC | PECULIAR CATEGORY |
|---|---|
| PERFORMANCE | NONE |
| DESIGN | FEMALE |
| PRICE | STUDENT |
| SIZE | NONE |
| ⋮ | ⋮ |

TEXT MINING DEVICE, TEXT MINING METHOD, AND TEXT MINING PROGRAM

This application is the National Phase of PCT/JP2007/060133, filed May 17, 2007, which claims priority to Japanese Application No. 2006-147038, filed May 26, 2006, the disclosures of which are hereby incorporated by reference in their entirety.

TECHNICAL FIELD

The present invention relates to a text mining device which extracts characteristics from a text set and, more specifically, to a text mining device which extracts characteristics from a text set that is configured with a plurality of different kinds of texts.

BACKGROUND ART

"Text mining" is processing which takes inputs of a set of texts that are classified into a plurality of categories according to a certain classification axis, and finds peculiar characteristics in a text that belongs to a specific category designated by a user as an analysis target. This enables the user to know the characteristics of the designated category.

A related text mining device is structured to extract words from each text, and extract words or combinations of words that are highly related to the text that belongs to the analysis-target category as the characteristics of that category.

An example of this type of text mining device is depicted in Patent Document 1. The text mining device depicted in Patent Document 1 has: a characteristic word extraction processing unit for extracting words and phrases that characterize a mining-target text; an analysis axis setting processing unit for setting a classification axis to be a target of analysis; and a related word/phrase attaining unit for extracting words and phrases that are highly related to each category of the classification axes. The text mining device extracts the words and phrases that are deeply related to each category of the classification axes set by a user as the targets of the analysis.

Patent Document 1: Japanese Unexamined Patent Publication 2003-141134

DISCLOSURE OF THE INVENTION

In text mining, when the set of the texts as the mining target is configured with a plurality of different kinds of texts of different citations, the characteristics extracted therefrom are not necessarily the characteristics that are in common to the texts of each citation. In such case, if it is possible to show the user whether each of the extracted characteristics is in common to all the texts regardless of the citations or it is observed only in the text of a specific citation, the user may be able to attain still wider information.

For example, it is assumed here that a survey regarding a certain product is conducted, and there are obtained a large number of answer texts that are classified into two categories of "interested in the product" and "not interested in the product" depending on whether the respondents are interested in the product or not. In this case, it is possible to extract the words highly related to the answers in the category of "interested in the product", for example, as the characteristic of the category by conducting text mining through taking the set of the texts as the target. It is assumed here that the words "design", "price", "function", and the like are extracted as the characteristics of the category of "interested in the product".

Meanwhile, when surveys are conducted in a plurality of districts, the mining-target texts may be configured with a plurality of kinds of texts that are of the surveys conducted at different districts, e.g., texts made based on the answers obtained in a first district as the citation, texts made based on the answers obtained in a second district as the citation, etc. In that case, the words such as "design", "price", "function", and the like extracted as the characteristics of the category of "interested in the product" are not necessarily the words that appear in common to the answers obtained in each district but may be the words that appear only in the answers obtained in the first district or the words that appear in the answers obtained in the second district.

It is assumed here that there is such a condition that the word "design" appears only in the answers of the first district and the word "price" appears only in the answers of the second district, for example. If such condition can be presented to the user, the user can realize that "design" may be taken into serious consideration particularly in the first district and "price" may be taken into serious consideration particularly in the second district.

Next, as another example, it is assumed that texts having descriptions of inquiry contents from customers are accumulated by being classified into categories of "complaint", "request", and the like depending on the contents received at a contact center. In this case, it is possible to extract the words that are highly related to the text in the category of "complaint", for example, as the characteristics of that category by conducting text mining on the set of texts as the target.

Meanwhile, when the contact center accepts inquiries by both e-mails and telephones, the mining-target texts may be configured with two kinds of texts, i.e., texts made based on e-mails from the customers as the citation and texts made based on the telephones from the customers as the citation, which are obtained as a result of performing speech recognition on the contents of communications made on the telephones. In that case, the words extracted as the characteristics of the category of "complaint" may not necessarily be the words that appear in common to both inquiries made by telephones and e-mails but may be the words that appear only in the inquiries made by the telephones or the inquiries made by e-mails.

In general, when speech data is put into a text by performing speech recognition, it is not always possible to properly recognize the spoken words. The spoken words may be misrecognized as different words. Thus, a word "fault ("kosho" in Japanese)" may be misrecognized as "name ("kosho" in Japanese)" by speech recognition, for example, and the word "name" may be included only in the recognition result obtained by performing speech recognition on the contents of the communications on the telephones. Thus, when the words extracted as the characteristics of the category of "complaint" are "fault", "name", "operating sound", and the like, for example, and if the word "name" only appears in the recognition result obtained by performing the speech recognition on the contents of the communications on the telephones, the user may be able to realize that the word "name (kosho)" is the misrecognition of the word "fault (kosho)" by presenting such condition to the user.

However, the related mining text device does not take consideration over a case where the mining-target texts are configured with a plurality of kinds of texts of different citations. Thus, it is not possible to show the user whether the extracted characteristics are in common to all the texts regardless of the citations or the extracted characteristics are observed only in the texts of a specific citation in a deviated manner.

Meanwhile, when the mining-target texts are classified according to a plurality of classification axes, the user may be able to attain still wider information if it is possible to show whether the characteristics (characteristics of the category designated by the user as the analysis target) extracted by text mining appear in common to the texts in all the categories of a certain classification axis or appear only in the texts in a specific category of a certain classification axis.

For example, it is assumed that a large number of texts of answers for a survey regarding a certain product are obtained. Further, it is also assumed that the texts of the answers are classified into two categories of "interested in the product" and "not interested in the product" according to a classification axis indicating whether or not the respondents are interested in the product, and also classified into two categories of "male" and "female" according to a classification axis of sex of the respondents. In this case, it is possible to extract the words highly related to the answers in the category of "interested in the product", for example, as the characteristics of the category by conducting text mining through taking the set of the texts as the target. It is assumed here that the words "design", "price", "function", and the like are extracted as the characteristics of the category of "interested in the product".

It is obvious that these words are strongly related to the category of "interested in the product" regarding the classification axis indicating whether or not the respondents are interested in the product. However, it is not possible to simply assume the extent of relevancy with respect to other classification axis (the sex of the respondents, for example) regarding each category of that classification axis. The word may be a word that uniformly appears in all the texts regardless of the sex of the respondents, may be the word that appears only in the answers given by "female" respondents, or may be the word that appears only in the answers given by "male" respondents.

In this case, assuming that there is such a condition that the word "design" appears only in the answers given by "female" respondents and the word "price" appears only in the answers given by "male" respondents, the user may be able to realize that females take serious consideration on the "design" and the males take serious consideration on the "price", if such condition can be presented to the user.

However, the related mining text device does not take consideration over whether or not there is a difference between each of the categories of a certain classification axis regarding the appearance of the extracted characteristics in the texts. Thus, it is not possible to show the user whether each of the characteristics is observed uniformly in all the texts or observed only in the texts of a specific category in a deviated manner.

As described above, a first issue of the related text mining device is that it is not possible to show the user whether the characteristics extracted by text mining are in common to all the texts regardless of the citations or the characteristics are observed only in the texts of a specific citation in a deviated manner, when the mining-target texts are configured with a plurality of kinds of texts of different citations.

The reason for this is that there is no consideration taken over a case where the mining-target texts are configured with a plurality of kinds of texts of different citations.

A second issue is that it is not possible to show the user whether the characteristics extracted by text mining are observed uniformly in all the texts or observed only in the texts of a specific category in a deviated manner, when the mining-target texts are classified according to a plurality of classification axes.

The reason for this is that there is no consideration taken over whether or not there is a difference between the categories to which the texts belong, regarding the appearance of the extracted characteristics in the texts.

An object of the present invention is to provide a text mining device and the like, which can show the user whether the characteristics extracted by text mining are in common to all the texts regardless of the citations or the characteristics are observed only in the texts of a specific citation in a deviated manner, when the mining-target texts are configured with a plurality of kinds of texts of different citations.

Another object of the present invention is to provide a text mining device and the like, which can show the user whether the characteristics extracted by text mining are observed uniformly in all the texts or observed only in the texts of a specific category in a deviated manner, when the mining-target texts are classified according to a plurality of classification axes.

A text mining device according to the present invention includes: a citation information creating device which creates, by each of the characteristics extracted from a set of texts collected from a plurality of citations, citation information of the texts containing the characteristics; and a text mining result output device which outputs the characteristics and the citation information in a corresponding manner.

Note here that "citation information" is information showing the tendency of the citations of the texts that contain the characteristics.

With the above-described text mining device, it is possible to present the user each of the characteristics extracted from the text set and the information regarding the citations of the texts that contain the characteristics in a corresponding manner.

Therefore, it is possible to show the user whether the characteristic extracted by text mining is in common to all the texts regardless of the citations or is observed only in the texts of a specific citation in a deviated manner, when the mining-target texts are a plurality of kinds of texts of different citations.

A text mining device according to the present invention includes: an associated classification axis discriminating device which discriminates, by each of the characteristics extracted from a set of texts classified according to a plurality of classification axes, a classification axis whose category to which the text belongs is strongly associated with whether or not the text contains the characteristic; a peculiar category discriminating device which discriminates the category of the classification axis that has the number of belonging texts largely diverted from a proper value considering the number of texts by each of the categories of the classification axis in the entire set of the texts that contain the characteristics; and an extraction result with peculiar category output device which outputs the characteristic and the category in a corresponding manner.

The above-described text mining device can discriminate, by each of the characteristics extracted by the text mining, the classification axis that is strongly associated with whether or not the text contains the characteristic. Further, among the categories of that classification axis, the text mining device can discriminate the category that has the actual number of belonging texts in the set of the texts containing the characteristic largely diverted from the expected value, and output each of the characteristics by annexing the categories to the respective characteristics.

Therefore, when the mining-target texts are classified according to a plurality of classification axes, it is possible to show the user whether each of the extracted characteristics is observed uniformly in all the texts or observed only in the text of a specific category of a certain classification axis in a deviated manner.

A text mining method according to the present invention: extracts characteristics from a set of texts collected from a plurality of citations; creates, by each of the characteristics, citation information of the texts containing the characteristics; and outputs the characteristics and the citation information in a corresponding manner.

With the above-described text mining method, it is possible to present the user each of the characteristics extracted from the text set and the information regarding the citations of the texts that contain the characteristics in a corresponding manner.

Therefore, it is possible to show the user whether the characteristic extracted by text mining is in common to all the texts regardless of the citations or is observed only in the texts of a specific citation in a deviated manner, when the mining-target texts are a plurality of kinds of texts of different citations.

A text mining method according to the present invention: extracts characteristics from a set of texts classified according to a plurality of classification axes; discriminates from the classification axes, by each of the characteristics, a classification axis whose category to which the text belongs is strongly associated with whether or not the text contains the characteristic; discriminates the category of the classification axis that has the number of belonging texts largely diverted from a proper value considering the number of texts by each of the categories of the classification axis in the entire set of the texts that contain the characteristics; and outputs the characteristic and the category in a corresponding manner.

The above-described text mining method can discriminate, by each of the characteristics extracted by the text mining, the classification axis that is strongly associated with whether or not the text contains the characteristic. Further, among the categories of that classification axis, the text mining method can discriminate the category that has the actual number of belonging texts in the set of the texts containing the characteristic largely diverted from the expected value, and output the each of the characteristics by annexing the categories to the respective characteristics.

Therefore, when the mining-target texts are classified according to a plurality of classification axes, it is possible to show the user whether each of the extracted characteristics is observed uniformly in all the texts or observed only in the text of a specific category of a certain classification axis in a deviated manner.

A text mining program according to the present invention enables a computer to: extract characteristics from a set of texts collected from a plurality of citations; execute processing for creating, by each of the characteristics, citation information of the texts containing the characteristics; and execute processing for outputting the characteristics and the citation information in a corresponding manner.

With the above-described text mining program, it is possible to present the user each of the characteristics extracted from the text set and the information regarding the citations of the texts that contain the characteristics in a corresponding manner.

Therefore, it is possible to show the user whether the characteristic extracted by text mining is in common to all the texts regardless of the citations or is observed only in the texts of a specific citation in a deviated manner, when the mining-target texts are a plurality of kinds of texts of different citations.

A text mining program according to the present invention which enables a computer to execute output processing which extracts characteristics from a set of texts classified according to a plurality of classification axes and outputs the characteristics. Further, the text mining program enables the computer to execute: processing for discriminating from the classification axes, by each of the characteristics, a classification axis whose category to which the text belongs is strongly associated with whether or not the text contains the characteristic; processing for discriminating the category of the classification axis that has the number of belonging texts largely diverted from a proper value considering the number of texts by each of the categories of the classification axis in the entire set of the texts that contain the characteristics; and output of the characteristic and the category in a corresponding manner in the output processing.

The above-described text mining program can discriminate, by each of the characteristics extracted by the text mining, the classification axis that is strongly associated with whether or not the text contains the characteristic. Further, among the categories of that classification axis, the text mining program can discriminate the category that has the actual number of belonging texts in the set of the texts containing the characteristic largely diverted from the expected value, and output the each of the characteristics by annexing the categories to the respective characteristics.

Therefore, when the mining-target texts are classified according to a plurality of classification axes, it is possible to show the user whether each of the extracted characteristics is observed uniformly in all the texts or observed only in the text of a specific category of a certain classification axis in a deviated manner.

With the present invention, it is possible to present the user each of the characteristics extracted from the text set and the information regarding the citations of the texts that contain the characteristics in a corresponding manner.

Therefore, it is possible to show the user whether the characteristic extracted by text mining is in common to all the texts regardless of the citations or is observed only in the texts of a specific citation in a deviated manner, when the mining-target texts are a plurality of kinds of texts of different citations.

Further, the present invention makes it possible to discriminate, by each of the characteristics extracted by the text mining, the classification axis that is strongly associated with whether or not the text contains the characteristic. Further, among the categories of that classification axis, the present invention makes it possible to discriminate the category that has the actual number of belonging texts in the set of the texts containing the characteristic largely diverted from the expected value, and to output the each of the characteristics by annexing the categories to the respective characteristics.

Therefore, when the mining-target texts are classified according to a plurality of classification axes, it is possible to show the user whether each of the extracted characteristics is observed uniformly in all the texts or observed only in the text of a specific category of a certain classification axis in a deviated manner.

BEST MODE FOR CARRYING OUT THE INVENTION

Next, the structure and operations of a text mining device 11 as a first exemplary embodiment of the invention will be described by referring to the accompanying drawings.

Referring to FIG. 1, the text mining device 11 is configured with an input device 1 such as a keyboard and a mouse, a storage device 21 such as a hard disk device for storing information, a data processing device 31 operated by control of a program, and an output device 4 such as a display device.

The storage device 21 includes a text set storage unit 201, a category information storage unit 202, and an extraction result storage unit 203.

The text set storage unit 201 stores mining-target texts in such a form that citations of each text can be known. In this case, for example, the texts may be stored separately to a first citation text set storage unit to an N-th citation text set storage unit based on the citations thereof, as shown in FIG. 1. Alternatively, the citations of the texts may be stored by being related to the respective texts.

The category information storage unit 202 stores information indicating the categories to which the texts belong, by relating those to the corresponding texts that are stored in the text set storage unit 201.

The extraction result storage unit 203 stores characteristics of the category designated by a user and the texts containing the characteristics in a corresponding manner as a result of text mining. The characteristics extracted as the result of the text mining are a part of the texts, such as a single word, a combination of a plurality of words, phrases, sentences, paragraphs, etc.

The data processing device 31 includes a characteristic expression extracting device 301, a main citation discriminating device 302, and an extraction result with main citation output device 303.

The characteristic expression extracting device 301 performs text mining on the text set stored in the text set storage unit 201, and extracts the characteristics of the category that is designated by the user through the input device 1. Further, the expression extracting device 301 stores the result thereof to the extraction result storage unit 203.

The text mining can be structured to extract words from each text, and to extract the words that are highly related to the texts that belong to the analysis-target category as the characteristics of that category, for example. Instead of the words, it is also possible to extract a part of the texts such as a combination of a plurality of words, phrases, sentences, paragraphs as the characteristics.

The main citation discriminating device 302 (an example of a citation information creating device) refers to the text set storage device 201 to discriminate the main citations of the texts containing each of the characteristics stored in the extraction result storage unit 203, and relates the citations to the characteristics as the citation information. For example, among the citations of the texts containing each of the characteristics stored in the extraction result storage unit 203, the citation of the largest number can be related to the corresponding characteristic.

Not only a single main citation but also a plurality of main citations may be related to each of the characteristics. Further, if there is no citation that is appropriate as the main citation, no citation may be related to that characteristic.

For example, the number of texts containing each of the characteristics stored in the extraction result storage unit 203 is counted for each citation, and all the citations having the number of the texts exceeding a preset threshold value may be related to that characteristic as the main citations. Further, a structural ratio of each citation in the texts containing each of the characteristics stored in the extraction result storage unit 203 may be calculated, and all the citations having the ratio that exceeds a preset threshold value may be related to that characteristic as the main citations.

Further, when a plurality of main citations are to be related, it may also be structured to re-judge that there is no appropriate citation, since all of such a large number of main citations cannot be considered as the major citations.

The extraction result with main citation output device 303 (an example of a mining result output device) outputs each of the characteristics stored in the extraction result storage unit 203 with the main citation of the texts that contain the respective characteristics through the output device 4.

Next, operations of the text mining device 11 will be described in detail by referring to FIG. 1 and FIG. 2.

First, the characteristic expression extracting device 301 reads out a mining-target category that is designated by the user through the input device 1 (step A1). The characteristic expression extracting device 301 also refers to the category information storage unit 202 to execute text mining, and obtains the characteristics that are peculiar to the texts that belong to the category designated by the user in step A1 among the texts stored in the text set storage unit 201 and a set of the texts containing the characteristics (step A2). The characteristic expression extracting device 301 relates the obtained characteristics and the set of texts containing the characteristics, and stores those to the extraction result storage unit 203 as the extraction result (step A3).

Then, from the extraction result stored in the extraction result storage unit 203, the main citation discriminating device 302 selects one of the characteristics extracted by the characteristic expression extracting device 301 (step A4), and reads out the set of the texts containing that characteristic (step A5). Further, the main citation discriminating device 302 refers to the text set storage unit 201 to discriminate the main citation of the texts in that set (step A6). The main citation discriminating device 302 repeats the processing for all the characteristics that are stored in the extraction result storage unit 203 (step A7).

At last, the extraction result with main citation output device 303 outputs each of the characteristics stored in the extraction result storage unit 203 with the main citations of the texts containing the respective characteristics discriminated by the processing of step A4-step A6 (step A8), and the processing is ended.

In the explanations of the exemplary embodiment, it has been described that the extraction result with main citation output device 303 executes the output action after the main citation discriminating device 302 discriminates the main citation of the texts containing each of the characteristics stored in the extraction result storage unit 203. However, it is also possible to be structured such that the main citation discriminating device 302 discriminates the main citation of the text containing a part of the characteristics stored in the extraction result storage unit 203, and the extraction result with main citation output device 303 repeatedly outputs the discriminated citation.

Next, effects of the exemplary embodiment will be described.

This exemplary embodiment discriminates the main citations of the texts containing each of the characteristics extracted by the text mining are discriminated, outputs the discriminated main citations along with the respective characteristics. This enables the user to know in the texts of which citation the characteristics extracted by the text mining are mainly observed. Further, particularly, when there is no citation appropriate as the main citation, it is structured not to output the citation. This enables the user to know that the characteristics extracted by the text mining appear only in the texts of one of the citations in a deviated manner, when that is the case.

Next, the structure and operations of a text mining device 12 as a second exemplary embodiment of the present invention will be described by referring to the accompanying drawings.

Referring to FIG. 3, the text mining device 12 is different from the text mining device 11 shown in FIG. 1 in respect that a data processing device 32 has a structural ratio calculating device 304 and an extraction result with structural ratio output device 305 instead of the main citation discriminating device 302 and the extraction result with main citation output device 303 in the structure of the data processing device 31.

The structural ratio calculating device 304 (an example of citation information creating device) refers to the text set storage unit 201 regarding each of the characteristics stored in the extraction result storage unit 203 to obtain the structural ratio of each of the citations of the texts containing the respective characteristics as the citation information.

The extraction result with structural ratio output device 305 (an example of a mining result output device) outputs each of the characteristics stored in the extraction result storage unit 203 with the structural ratio by each citation of the texts containing the respective characteristics through the output device 4. In this case, each of the structural ratios may be outputted in numerals, or may be outputted in a form of a graph showing the ratios. Further, instead of showing the values of the ratios themselves, it is also possible to output icons showing the extent of the ratios.

Next, operations of the text mining device 12 will be described in detail by referring to FIG. 3 and FIG. 4.

The operations of the characteristic expression extracting device 301 of this exemplary embodiment shown in steps A1-A4 of FIG. 4 are the same as the operations of the characteristic expression extracting device 301 of the first exemplary embodiment, so that explanations thereof are omitted.

In this exemplary embodiment, after the operations of the characteristic expression extracting device 301, the structural ratio calculating device 304 selects, from the extraction result stored in the extraction result storage unit 203, one of the characteristics selected by the characteristic expression extracting device 301 (step B1), and reads out a set of texts that contain the characteristic (step B2). Further, the structural ratio calculating device 304 calculates the structural ratios of each citation of the texts in that set by referring to the text set storage unit 201 (step B3). The structural ratio calculating device 304 repeats the processing for all the characteristics that are stored in the extraction result storage unit 203 (step B4).

At last, the extraction result with structural ratio output device 305 outputs each of the characteristics stored in the extraction result storage unit 203 with the structural ratios of the texts containing the respective characteristics calculated by the processing of step B1-step B4 (step B5), and the processing is ended.

In the explanations of the exemplary embodiment, it has been described that the extraction result with structural ratio output device 305 executes the output action after the structural ratio calculating device 304 calculates the structural ratios by each citation of all the texts containing each of the characteristics stored in the extraction result storage unit 203. However, it is also possible to be structured such that the structural ratio calculating device 304 calculates the structural ratio by each citation of the texts containing a part of the characteristics stored in the extraction result storage unit 203, and the extraction result with structural ratio output device 305 repeatedly outputs the calculated ratio.

Next, effects of the text mining device 12 will be described.

With the second text mining device 12, the structural ratios of the texts containing each of the characteristics extracted by the text mining are calculated, and the calculated structural ratios are outputted along with the respective characteristics. This enables the user to know in the text of which citation the characteristics extracted by the text mining are mainly observed. Further, particularly, when the characteristics extracted by the text mining appear in only one of the citations in a deviated manner, it is possible for the user to know the extent of deviations.

Next, the structure and operations of a text mining device 13 as a third exemplary embodiment of the present invention will be described by referring to the accompanying drawings.

Referring to FIG. 5, the text mining device 13 is different from the text mining device 11 shown in FIG. 1 in respect that a data processing device 33 has a peculiar citation discriminating device 306 and an extraction result with peculiar citation output device 307 instead of the main citation discriminating device 302 and the extraction result with main citation output device 303 in the structure of the data processing device 31.

The peculiar citation discriminating device 306 (an example of a citation information creating device) refers to the text set storage device 201 to discriminate the peculiar citations of the texts containing each of the characteristics stored in the extraction result storage unit 203, and relates the peculiar citations to the characteristics as the citation information. Note here that the peculiar citation indicates the citation that is cited for a number of texts that is largely deviated from its expected value.

For example, when there are fifteen-hundred texts cited from "e-mail" and five hundred texts cited from "World Wide Web (referred to as "Web" hereinafter)" stored in the text set storage unit 201, the expected value for the number of the texts whose citations are "e-mail" is "75" among one hundred texts, and the expected value for the number of the texts whose citations are "Web" is "25. Among the one hundred texts, when the actual number of texts cited from "Web" is largely diverted from "25", "Web" is the peculiar citation in the one hundred texts.

Whether or not the actual number of texts is largely diverted from the expected value can be judged depending on whether or not an absolute value of a difference between the actual number and the expected value exceeds a preset threshold value, for example. Further, it is also possible to make judgment depending on whether or not a proportion of the absolute value of the difference between the actual number and the expected value with respect to the expected value exceeds a preset threshold value. Furthermore, other methods may be used for the judgment as well.

The peculiar citation discriminating device 306 may discriminate a plurality of peculiar citations for each of the characteristics, or may discriminate a single peculiar citation whose expected value and the actual number are diverted most.

The extraction result with peculiar citation output device 307 (an example of a mining result output device) outputs each of the characteristics stored in the extraction result storage unit 203 with the peculiar citation of the texts containing the respective characteristics through the output device 4.

As the peculiar citations in the set of the texts that contain a certain characteristic, there are two types; one of the types is that the number of texts of the citation that largely exceeds its expected value, and the other type is that the number of texts of the citation that largely falls below its expected value. In this exemplary embodiment, it is possible to provide such a structure where the peculiar citation discriminating device 306 separately handles the both types, and the extraction result with peculiar citation output device 307 outputs in such a manner that the difference between both types can be known. Further, the peculiar citation discriminating device 306 may discriminate only one of the types as the peculiar citation.

Next, operations of the text mining device 13 will be described in detail by referring to FIG. 5 and FIG. 6.

The operations of the characteristic expression extracting device 301 of this exemplary embodiment shown in steps A1-A3 of FIG. 6 are the same as the operations of the characteristic expression extracting device 301 of the first exemplary embodiment, so that explanations thereof are omitted.

In this exemplary embodiment, after the operations of the characteristic expression extracting device 301, the peculiar citation discriminating device 306 selects, from the extraction result stored in the extraction result storage unit 203, one of the characteristics selected by the characteristic expression extracting device 301 (step C1), and reads out a set of the texts that contain the characteristic (step C2). Further, the peculiar citation discriminating device 306 discriminates the peculiar citation in that set (step C3). The peculiar citation discriminating device 306 repeats the processing for all the characteristics that are stored in the extraction result storage unit 203 (step C4).

At last, the extraction result with peculiar citation output device 307 outputs each of the characteristics stored in the extraction result storage unit 203 with the peculiar citation of the texts containing the respective characteristics discriminated by the processing of step C1-step C4 (step C5), and the processing is ended.

In the explanations of the exemplary embodiment, it has been described that the extraction result with peculiar citation output device 307 executes the output action after the peculiar citation discriminating device 306 discriminates the peculiar citations of all the texts containing each of the characteristics stored in the extraction result storage unit 203. However, it is also possible to be structured such that the peculiar citation discriminating device 306 discriminates the peculiar citation of the texts containing a part of the characteristics stored in the extraction result storage unit 203, and the extraction result with peculiar citation output device 307 repeatedly outputs the discriminated peculiar citation.

Next, effects of this exemplary embodiment will be described.

In this exemplary embodiment, the peculiar citations of the texts containing each of the characteristics extracted by the text mining are discriminated, and the discriminated peculiar citations are outputted along with the respective characteristics. Thus, when the peculiar citations extracted by the text mining appear with an extremely greater frequency than a normal case or appear with an extremely smaller frequency than a normal case, it is possible for the user to know that fact.

Further, when the citation of the texts stored in the text set storage unit 201 is deviated to a specific type, the citation is outputted as the main citation of the texts with the first exemplary embodiment of the present invention. Thus, the user may not be able to know even if there is a deviation that is different from a deviation observed in the original text set regarding the citations of the texts containing a certain characteristic. However, it can be avoided with this exemplary embodiment since such citation is outputted as the peculiar citation, when the deviation of that citation is different from the deviation of the original text set.

Next, the structure and operations of a text mining device 14 as a fourth exemplary embodiment of the present invention will be described by referring to the accompanying drawings.

Referring to FIG. 7, the text mining device 14 is different from the text mining device 11 shown in FIG. 1 in respect that a data processing device 34 has a divergence degree calculating device 308 and an extraction result with divergence degree output device 309 instead of the main citation discriminating device 302 and the extraction result with main citation output device 303 in the structure of the data processing device 31.

The divergence degree calculating device 308 (an example of a citation information creating device) obtains a set of texts containing each of the characteristics stored in the extraction result storage unit 203, and refers to the text set storage device 201 to calculate the divergence degrees regarding the number of texts of each citation within the set as the citation information. Note here that the divergence degree is a value showing the extent of difference between the actual number and the expected value thereof.

As the divergence degree, it is possible to employ a difference between the actual number and the expected value, a proportion of a difference between the actual number and the expected value with respect to the expected value, etc. Further, the divergence degree may also be defined by using other methods.

For example, provided that there are two-thousand texts in total stored in the text set storage unit 201, and the citations of fifteen hundred texts out of those are "e-mail" while the citations of five hundred texts are "Web", the expected value for the number of texts whose citations are "e-mail" among one hundred texts is "100×1500/2000=75", and the expected value for the number of texts whose citations are "Web" is "100×500/2000=25". Among the one hundred texts, when the actual number of texts having "e-mail" as the citation is "60" and the number of texts having "Web" as the citation is "40", the divergence degree regarding the number of texts whose citations are "e-mail" is "(60−75)÷75=−0.2" and the divergence degree regarding the number of texts whose sources are "Web" is "(40−25)÷25=0.6", when the proportion of the difference between the actual number and the expected value with respect to the expected value is employed as the divergence degree.

The extraction result with divergence degree output device 309 (an example of a mining result output device) outputs each of the characteristics stored in the extraction result storage unit 203 with the divergence degrees by each citation of the texts containing the respective characteristics through the output device 4. In this case, each of the divergence degrees may be outputted in numerals, or may be outputted in a form of a graph. Further, instead of showing the values of the divergence degrees themselves, it is also possible to output icons showing the extent of the divergence.

Next, operations of the text mining device 14 will be described in detail by referring to FIG. 7 and FIG. 8.

The operations of the characteristic expression extracting device 301 of this exemplary embodiment shown in steps A1-A4 of FIG. 8 are the same as the operations of the characteristic expression extracting device 301 of the first exemplary embodiment, so that explanations thereof are omitted.

In this exemplary embodiment, after the operations of the characteristic expression extracting device 301, the divergence degree calculating device 308 selects, from the extraction result stored in the extraction result storage unit 203, one of the characteristics selected by the characteristic expression extracting device 301 (step D1), and reads out a set of texts that contain the characteristic (step D2). Further, the divergence degree calculating device 308 calculates the divergence degrees regarding the number of texts of each citation in that set (step D3). The divergence degree calculating device 308 repeats the processing for all the characteristics that are stored in the extraction result storage unit 203 (step D4).

At last, the extraction result with divergence degree output device 309 outputs each of the characteristics stored in the extraction result storage unit 203 with the divergence degrees of the texts containing the respective characteristics calculated for each citation by the processing of step D1-step D4 (step D5), and the processing is ended.

In the explanations of the exemplary embodiment, it has been described that the extraction result with divergence degree output device 309 executes the output action after the divergence degree calculating device 308 calculates the divergence degrees by each citation of the texts containing each of the characteristics stored in the extraction result storage unit 203. However, it is also possible to be structured such that the divergence degree calculating device 308 calculates the divergence degree for each citation of the number of texts containing a part of the characteristics stored in the extraction result storage unit 203, and the extraction result with divergence degree output device 309 repeatedly outputs the calculated divergence degree.

Next, effects of this exemplary embodiment will be described.

In this exemplary embodiment, the divergence degrees for each citation of the number of texts containing each of the characteristics extracted by the text mining are discriminated, and the discriminated peculiar citations are outputted along with the respective characteristics. When the characteristics extracted by the text mining appear with an extremely greater frequency than a normal case or appear with an extremely smaller frequency than a normal case, the absolute value of the divergence degree of the number of the texts of that citation becomes large, thereby making it possible for the user to know that fact. Further, at that time, the user can know the degree of divergence with respect to the normal case.

In the first to fourth exemplary embodiments of the present invention, there has been described that the characteristic expression extracting device 301 extracts the characteristics of the category that is designated by the user through the input device from the text set stored in the text set storage unit 201. However, it is also possible to extract the characteristics of the entire text set, instead of extracting the characteristics of only a specific category. When such structure is employed, the category information storage unit 202 may not be necessary.

In that case, the characteristic expression extracting device 301 may be structured to extract words from each text, and to extract the words that appear in many of the texts as the characteristics of the entire text set, for example. Instead of the words, it is also possible to extract a part of the texts such as a combination of a plurality of words, phrases, sentences, paragraphs as the characteristics.

Next, the structure and operations of a text mining device 15 as a fifth exemplary embodiment of the present invention will be described by referring to the accompanying drawings.

Referring to FIG. 9, the text mining device 15 is different from the text mining device 11 shown in FIG. 1 in respect that a data processing device 35 has an associated classification axis discriminating device 310 and an extraction result with peculiar category output device 312 instead of the main citation discriminating device 302 and the extraction result with main citation output device 303 in the structure of the data processing device 31.

Unlike the text set storage unit 201 of the text mining device 11 shown in FIG. 1, a text set storage unit 204 does not need to store the mining-target texts in a form with which the citations of each text can be known.

Further, unlike the category information storage unit 202 of the text mining device 11 shown in FIG. 1, a category information storage unit 205 stores information showing the categories in a plurality of classification axes to which each of the texts stored in the text set storage unit 204 belong.

In that case, as shown in FIG. 9, for example, the texts belonging to each category of each classification axis may be stored from the first classification axis category information unit to the N-th classification axis category information unit, or the category of the respective texts in each of the classification axes may be stored for each text.

The associated classification axis discriminating device 310 judges, for each of the classification axes stored in the category information storage unit 205, whether or not the texts contain each of the characteristics stored in the extraction result storage unit 203 vary depending on the categories to which the texts belong so as to discriminate the classification axis that is associated with whether or not the texts contain the characteristic. It is possible to judge whether or not there is an association between whether or not the text contains the characteristic and the category to which the text belongs by using a chi-square ($\chi$) test or the like.

The peculiar category discriminating device 311 discriminates a peculiar category in a set of texts containing each of the characteristics stored in the extraction result storage unit 203 among the categories of the classification axis that is discriminated as being related by the associated classification axis discriminating device 310, and relates it to the corresponding characteristic. The peculiar category indicates a category that has the number of belonging texts that is largely diverted with respect to the expected value.

Whether or not the actual number of texts is largely diverted from the expected value can be judged depending on whether or not an absolute value of a difference between the actual number and the expected value exceeds a preset threshold value, for example. Further, it is also possible to make judgment depending on whether or not a proportion of the absolute value of the difference between the actual number and the expected value with respect to the expected value exceeds a preset threshold value. Furthermore, other methods may be used for the judgment as well.

The peculiar category discriminating device 311 may discriminate a plurality of peculiar categories for each of the characteristics, or may discriminate a single peculiar category whose expected value and the actual number are diverted most.

The extraction result with peculiar category output device 312 outputs each of the characteristics stored in the extraction result storage unit 203 with the peculiar category discriminated by the peculiar category discriminating device 311 through the output device 4.

As the peculiar categories in the set of the texts that contain a certain characteristic, there are two types; one of the types is that the number of texts that belong to the category largely exceeds its expected value, and the other type is that the number of texts that belong to the category largely falls below its expected value. In this exemplary embodiment, it is possible to provide such a structure where the peculiar category discriminating device 311 separately handles the both types, and the extraction result with peculiar category output device 312 performs an output action in such a manner that the difference between both types can be known. Further, the peculiar category discriminating device 311 may discriminate only one of the types as the peculiar category.

Next, operations of the exemplary embodiment will be described in detail by referring to FIG. 9 and FIG. 10.

The operations of the characteristic expression extracting device 301 of this exemplary embodiment shown in steps A1-A3 of FIG. 10 are the same as the operations of the characteristic expression extracting device 301 of the first exemplary embodiment, so that explanations thereof are omitted.

In this exemplary embodiment, after the operations of the characteristic expression extracting device 301, the associated classification axis discriminating device 310 reads out one of the characteristics from the extraction result stored in the extraction result storage unit 203 (step E1), and performs following processing of step E2 and thereafter.

The associated classification axis discriminating device 310 first reads out one of the classification axes from the category information storage unit 205 (step E2), and refers to the category information storage unit 205 and the extraction result storage unit 203 to discriminate whether or not the characteristics read out in step E1 are contained in the texts and whether or not those characteristics are related to the categories to which the texts belong regarding the classification axis read out in step E2 (step E3). The associated classification axis discriminating device 310 repeats the processing for all the classification axes in the category information storage unit 205 (step E4), and make pairs of the classification axes judged in step E3 with the corresponding characteristics to give those to the peculiar category discriminating device 311.

Regarding the characteristics and the classification axes given by the associated classification axis discriminating device 310, the peculiar category discriminating device 311 discriminates a peculiar category in a set of texts containing those characteristics from the categories of the classification axes (step E5).

Subsequently, the associated classification axis discriminating device 310 judges whether or not the processing of step E2-E5 has been completed for all the characteristics that are stored in the extraction result storage unit 203 (step E6). If there is any characteristic that has not been processed, the operation is returned to step E1 to continue the processing.

At last, the extraction result with peculiar category output device 312 outputs each of the characteristics stored in the extraction result storage unit 203 with the peculiar category of the texts containing the respective characteristics discriminated by step E5 (step E7), and the processing is ended.

With this exemplary embodiment, the classification axis whose mining-target category is designated by the user in step A1 does not need to be set as the target for the processing of step E3. This is because of the following reason. That is, based on the definition of mining, it is obvious for that classification axis that whether or not the text contains the characteristic is associated with the category to which the text belongs. Therefore, new information cannot be provided for the user even if the processing of E5 and E7 is executed.

Further, in step E3, there is not always only a single classification axis discriminated as being associated with each characteristic by the associated classification discriminating device 310. When the associated classification discriminating device 310 discriminates a plurality of classification axes, the peculiar category discriminating device 311 performs the processing of step E5 to each of the classification axes to discriminate the peculiar categories in the set of the texts containing each characteristic. Further, the extraction result with peculiar category output device 312 outputs all the peculiar categories discriminated in step E7.

Meanwhile, it is also possible to have a structure where the classification axis discriminated by the associated classification axis discriminating device 310 to be a single classification axis. In that case, the associated classification axis discriminating device 310 may calculate in step E3 the degree of associations between whether or not the texts contain the characteristics and the categories to which the texts belong, and may give to the peculiar category discriminating device 311 only the classification axis that is associated most strongly. The degree of associations between whether or not the texts contain the characteristics and the categories to which the texts belong can be expressed with Cramer's association coefficient or the like, and the classification axis with the largest value of such coefficient can be selected as the classification axis that is associated most strongly.

In the explanations of the exemplary embodiment, it has been described that the extraction result with peculiar category output device 311 executes the output action after the associated classification axis discriminating device 310 and the peculiar category discriminating device 311 perform the processing for all the characteristics stored in the extraction result storage unit 203. However, it is also possible to be structured such that the associated classification axis discriminating device 310 and the peculiar category discriminating device 311 perform the processing on a part of the characteristics stored in the extraction result storage unit 203, and the extraction result with peculiar category output device 312 repeatedly outputs the discriminated result.

Next, effects of this exemplary embodiment will be described.

In this exemplary embodiment, there is discriminated the classification axis that is strongly associated with whether or not the text contains a certain characteristic. Further, among the categories of the classification axis, the peculiar category in the set of the texts containing the characteristic is discriminated, and it is outputted along with the characteristic. With this, when the texts containing the extracted characteristic are deviated to a specific category in a certain classification axis, the user can know that information. Further, it is possible for the user to know the texts of which category each of the characteristics is observed in a deviated manner.

In this exemplary embodiment, the characteristic expressing extracting device 301 may be structured to extract the characteristics of the entire text set but not to extract the characteristic of the category designated by the user through the input device 1 regarding the text set stored in the text set storage unit 201.

Next, the structure and operations of a computer 16 as a sixth exemplary embodiment of the present invention will be described by referring to the accompanying drawings.

Referring to FIG. 11, the computer 16 includes an input device 1, a storage device 23, a data processing device 36, and an output device 4, as in the first to fifth exemplary embodiments of the present invention.

A text mining program 5 is loaded to the data processing device 36 to control the operations of the data processing device 36, and the storage device 23 is structured in the same manner as the storage device 21 of the first to fourth exemplary embodiments or the storage device 22 of the fifth exemplary embodiment. Through the control of the text mining program 5, the data processing device 36 executes the same processing as that of the data processing device 31 of the first exemplary embodiment, the data processing device 32 of the second exemplary embodiment, the data processing device 33 of the third exemplary embodiment, the data processing device 34 of the fourth exemplary embodiment, or the data processing device 35 of the fifth exemplary embodiment.

In the explanations of the first to sixth exemplary embodiments of the present invention, there has been described the structure where the characteristic expression extraction device 301 stores the result of text mining to the extraction result storage unit 203. However, it is also possible to employ a structure where the result of text mining is stored in a main storage device such as DRAM (Dynamic Random Memory).

Example 1

Next, operations of the best mode for carrying out the invention will be described by using concretive examples.

First, EXAMPLE 1 will be described by referring to the drawings. This EXAMPLE corresponds to the first exemplary embodiment of the present invention shown in FIG. 1 and FIG. 2.

Here, the operations of the exemplary embodiment of the present invention will be described by referring to a case where: the contents of inquiries made bye-mails and telephones are recorded; the inquiries are classified according to the types of the contents; and the user extracts the characteristics of the inquiries regarding "fault".

As shown in FIG. 12, texts as the targets of text mining are stored to the text set storage unit 201 in advance in such a form with which each of the citations thereof can be known. In the case, there are two kinds of citations, i.e., "e-mail" and "telephone". D1, D2, D3, D4, - - - are the texts whose citations are "e-mail", and D101, D102, D103, D104, - - - are the texts whose citations are "telephone". In this case, the text whose citation is "telephone" is a recognition result obtained by performing speech recognition on the contents spoken through the telephone, so that there are recognition errors contained in the text.

The texts stored in the text set storage unit 201 are classified into a plurality of categories in advance regarding the types of the inquiries, and the corresponding relations between the texts and the categories are stored in the category information storage unit 202. FIG. 13 shows an example thereof.

At this time, first, the characteristic expression extraction device 301 receives, from the user through the input device 1, designation of the target category for which the characteristics are extracted by text mining.

Here, the user designates the category "fault".

The characteristic expression extracting device 301 then executes extraction of a peculiar characteristic that belongs to the category "fault" among the set of texts stored in the text set storage unit 201, relates the characteristic and the text containing the characteristic, and records it to the extraction result storage unit 203 as the result of the text mining.

Here, it is assumed that the characteristic expression extracting device 301 extracts words that appear in the texts, and records the characteristics as in FIG. 14 to the extraction result storage unit 203.

Subsequently, the main citation discriminating device 302 discriminates the main citations of the texts containing each of the characteristics stored in the extraction result storage unit 203, and relates those to the respective characteristics.

Provided that the citations of 70% or more among the texts containing a given characteristic "P" is "S", it is assumed here that the citation "S" is the main citation of the texts that contain the characteristic "P".

The main citation discriminating device 302 first discriminates the main citation of the texts that contain the characteristic "power supply".

The main citation discriminating device 302 refers to the extraction result storage unit 203 shown in FIG. 14, and finds that the texts containing the characteristic "power supply" are five texts D1, D4, D9, D107, and D127. Then, the main citation discriminating device 302 refers to the text set storage unit 201 shown in FIG. 12, and finds that the citations of the three texts D1, D4, and D9 among those texts are "e-mail", and the citations of the two texts D102 and D127 are "telephone".

Based on those values, the main citation discriminating device 302 calculates that 60% of the citations for the texts containing the characteristic "power supply" is "e-mail" and 40% of the citations is "telephone". These values are both less than 70%, so that the main citation discriminating device 302 judges that there is no main citation for the texts that contain the characteristic "power supply".

Then, the main citation discriminating device 302 performs the same processing for the characteristic "screen", and calculates that citations for the 50% of the texts (D3 and D10) among the texts (D3, D10, D123, D126) which contain the characteristic "screen" are "e-mail", and citations for the 50% of the texts (D123 and D126) are "telephone". These values are both less than 70%, so that the main citation discriminating device 302 also judges that there is no main citation for the texts that contain the characteristic "screen".

For the next characteristic "inspection", it is calculated that no text (0%) has the citation of "e-mail" among the texts (D102, D104, D121) which contain the characteristic "inspection", and 100% of the texts has the citation of "telephone". As a result, the main citation discriminating device 302 judges that the main citation of the texts which contain the characteristic "inspection" is "telephone".

Meanwhile, for the next characteristic "remote controller", it is calculated that 75% of the texts (D7, D11, D15) among the texts (D7, D11, D15, D131) containing the characteristic "remote controller" has the citation of "e-mail", and 25% of the texts (D131) has the citation of "telephone". As a result, the main citation discriminating device 302 judges that the main citation of the texts that contain the characteristic "remote controller" is "e-mail".

The main citation discriminating device 302 repeats such processing for all the characteristics.

At last, the extraction result with main citation output device 303 outputs each of the characteristics stored in the extraction result storage unit 203 with the main citations of the texts containing the respective characteristics.

FIG. 15 shows an output example of this case.

From the output, the user can know that the characteristic "inspection" is the characteristic that mainly appears on the telephones, and the characteristic "remote controller" is the characteristic that mainly appears in e-mails. This enables the user to realize that there is a possibility of having recognition errors in speech recognition especially for the characteristic "inspection" that appears on the telephones in a deviated manner.

Next, Example 2 of the present invention will be described by referring to the drawings. This EXAMPLE corresponds to the second exemplary embodiment of the present invention shown in FIG. 3 and FIG. 4.

Here, EXAMPLE 2 will be described by using the same case as that of EXAMPLE 1. That is, described are the operations of the case where the user performs text mining by designating the category "fault", when the texts stored in the text set storage unit 201 shown in FIG. 12 are classified as in the category information storage unit 202 shown in FIG. 13.

At this time, first, the characteristic expression extracting device 301 extracts a peculiar characteristic that belongs to the category "fault", relates the characteristic to the text that contains the characteristic, and records it to the extraction result storage unit 203 as the result of the text mining. This operation is the same as that of the characteristic expression extracting device 301 of EXAMPLE 1, and the result shown in FIG. 14 is recorded to the extraction result storage unit 203.

Subsequently, the structural ratio calculating device 304 discriminates the structural ratio by each citation of the texts containing each of the characteristics stored in the extraction result storage unit 203, and relates those to the respective characteristics.

The structural ratio calculating device 304 first discriminates the structural ratios by each citation of the texts that contain the characteristic "power supply".

First, the structural ratio calculating device 304 refers to the extraction result storage unit 203 shown in FIG. 14, and finds that the texts containing the characteristic "power supply" are five texts D1, D4, D9, D107, and D127. Then, the structural ratio calculating device 304 refers to the text set storage unit 201 shown in FIG. 12, and finds that the citations of the three texts D1, D4, and D9 among those texts are "e-mail", and the citations of the two texts D102 and D127 are "telephone".

Based on those values, the structural ratio calculating device 304 calculates that 60% of the citations for the texts containing the characteristic "power supply" is "e-mail" and 40% of the citations is "telephone".

Then, the structural ratio calculating device 304 performs the same processing for the characteristic "screen", and calculates that citations for the 50% of the texts (D3 and D10) among the texts (D3, D10, D123, D126) which contain the characteristic "screen" are "e-mail", and citations for the 50% of the texts (D123 and D126) are "telephone".

For the next characteristic "inspection", it is calculated that no text (0%) has the citation of "e-mail" among the texts (D102, D104, D121) that contain the characteristic "inspection", and 100% of the texts has the citation of "telephone".

Further, for the next characteristic "remote controller", it is calculated that 75% of the texts (D7, D11, D15) among the texts (D7, D11, D15, D131) containing the characteristic "remote controller" has the citations of "e-mail", and 25% of the texts (D131) has the citation of "telephone". The structural ratio calculating device 304 repeats such processing for all the characteristics.

At last, the extraction result with structural ratio output device 305 outputs each of the characteristics stored in the extraction result storage unit 203 with the structural ratios by each citation of the texts containing the respective characteristics.

FIG. 16 shows an output example of this case. In this case, the structural ratios by each citation are shown in a form of a band graph.

Compared to the output of EXAMPLE 1 shown in FIG. 15, the user can know the extent of deviation between the citations based on the output shown in FIG. 16. In the case of FIG. 16, the user can know that especially the characteristic "inspection" is largely different from other characteristics in terms of the proportion of the citation, and that it is the characteristic that appears only on the telephone. With this, it can be found that the characteristic "inspection" is a characteristic that shows a different tendency from those of other characteristics. Thereby, the user can realize that there is a possibility of having recognition errors in speech recognition.

Next, EXAMPLE 3 of the present invention will be described by referring to the drawings. This EXAMPLE corresponds to the third exemplary embodiment of the present invention shown in FIG. 5 and FIG. 6.

EXAMPLE 3 will also be described by using the same case as that of EXAMPLE 1. That is, described are the operations of the case where the user performs text mining by designating the category "fault", when the texts stored in the text set storage unit 201 shown in FIG. 12 are classified as in the category information storage unit 202 shown in FIG. 13.

However, it is assumed in EXAMPLE 3 that there are one hundred twenty-five texts in total that are stored in the text set storage unit 201, and citations of one hundred texts among those are "e-mail" while citations of twenty-five texts are "telephone".

At this time, first, the characteristic expression extracting device 301 extracts a peculiar characteristic that belongs to the category "fault", relates the characteristic to the text that contains the characteristic, and records it to the extraction result storage unit 203 as the result of the text mining. This operation is the same as that of the characteristic expression extracting device 301 of EXAMPLE 1, and the result shown in FIG. 14 is recorded to the extraction result storage unit 203.

Subsequently, the peculiar citation discriminating device 306 discriminates the peculiar citation of the texts containing each of the characteristics stored in the extraction result storage unit 203, i.e., the citation that is cited for a number of texts that is largely diverted from its expected value, and relates it to the corresponding characteristic.

It is assumed here that whether or not the expected value and the actual number of texts are diverted can be judged depending on whether or not a proportion of a difference between the actual number of texts and the expected value with respect to the expected value exceeds a preset threshold value. That is, provided that an expected value of the number of texts whose citation is "S" is "E" and the actual number of texts whose citation is "S" is "X" in a set of texts containing a certain characteristic "P", the citation "S" is discriminated as a peculiar citation in the set of texts containing the characteristic "P", when the absolute value of "(X−E)/E" exceeds a threshold value 1.0.

The peculiar citation discriminating device 306 first discriminates the peculiar citations in a set of the texts that contain the characteristic "power supply".

First, the peculiar citation discriminating device 306 refers to the extraction result storage unit 203 shown in FIG. 14, and finds that the texts containing the characteristic "power supply" are five texts D1, D4, D9, D107, and D127.

Then, the peculiar citation discriminating device 306 calculates the expected value of the number of texts whose citations are "e-mail" among those five texts. Since there are one hundred twenty-five texts in total and citations of one hundred texts are "e-mail", the expected value of the number of texts whose citations are "e-mail" among the five texts containing the characteristic "power supply" becomes "5×100/125=4".

Further, it is found by referring to the text set storage unit 201 shown in FIG. 12 that the citations of three texts D1, D4, and D9 are actually "e-mail" among the five texts that contain the characteristic "power supply".

Based on those values, the peculiar discriminating device 306 judges whether or not the expected value of the number of texts whose citations are "e-mail" is largely diverted from the actual number regarding the five texts containing the characteristic "power supply". Here, the proportion of the difference between the actual number and the expected value with respect to the expected value is "(3−4)/4=−0.25", so that the absolute value thereof is not larger than 1.0. Therefore, the peculiar discriminating device 306 judges that the expected value and the actual number are not largely diverted.

Subsequently, the peculiar discriminating device 306 calculates the expected value of the number of texts whose citations are "telephone" among the five texts that contain the characteristic "power supply". Since the citations of the twenty-five texts among the one hundred twenty-five texts are "telephone", the expected value of the number of texts whose citations are "telephone" among the five texts containing the characteristic "power supply" becomes "5×25/125=1".

Further, it is found by referring to the text set storage unit 201 shown in FIG. 12 that the citations of two texts D107 and D127 are actually "telephone" among the five texts that contain the characteristic "power supply".

Based on those values, the peculiar discriminating device 306 judges whether or not the expected value of the number of texts whose citations are "telephone" is largely diverted from the actual number regarding the five texts containing the characteristic "power supply". Here, the proportion of the difference between the actual number and the expected value with respect to the expected value is "(2−1)/1=1", so that the absolute value thereof is not larger than 1.0. Therefore, the peculiar discriminating device 306 judges that the expected value and the actual number are not largely diverted.

Based on the result, the peculiar discriminating device 306 discriminates that there is no peculiar citation in the five texts that contain the characteristic "power supply". Then, the peculiar discriminating device 306 performs the same processing for the characteristic "screen".

Regarding the four texts (D3, D10, D123, D126) containing the characteristic "screen", the expected value of the number of texts whose citations are "e-mail" is "4×100/125=3.2", whereas there are actually two texts (D3 and D10) whose citations are "e-mail". Thus, the proportion of the difference between the actual number and the expected value with respect to the expected value is "(2−3.2)/3.2=−0.375", so that the absolute value thereof is not larger than 1.0.

Further, regarding the four texts containing the characteristic "screen", the expected value of the number of texts whose citations are "telephone" is "4×25/125=0.8", whereas there are actually two texts (D123 and D126) whose citations are "telephone". Thus, the proportion of the difference between the actual number and the expected value with respect to the expected value is "(2−0.8)/0.8=1.5", so that the absolute value thereof exceeds 1.0.

As a result, the peculiar citation discriminating device 306 discriminates that "telephone" is the peculiar citation, since the number of the texts whose citations are "telephone" is largely diverted from the expected value regarding the four texts that contain the characteristic "screen".

Regarding the three texts (D102, D104, D121) containing the next characteristic "inspection", the expected value of the number of texts whose citations are "e-mail" is "3×100/125=2.4", whereas there is actually no (0) text. Thus, the proportion of the difference between the actual number and the expected value with respect to the expected value is "(0−2.4)/2.4=−1". Further, the expected value of the number of texts whose citations are "telephone" is "3×25/125=0.6", whereas there are actually three texts. Thus, the proportion of the difference between the actual number and the expected value with respect to the expected value is "(3−0.6)/0.6=4". Therefore, only the absolute value the latter exceeds 1.0. As a result, the peculiar citation discriminating device 306 discriminates that "telephone" is the peculiar citation regarding the three texts that contain the characteristic "inspection".

Meanwhile, the expected value of the number of texts whose citations are "e-mail" regarding the four texts (D7, D11, D15, D131) containing the next characteristic "remote controller" is "4×100/125=3.2", whereas there are actually three texts (D7, D11, D15). Thus, the proportion of the difference between the actual number and the expected value with respect to the expected value is "(3−3.2)/3.2=−0.0625". Further, the expected value of the number of texts whose citations are "telephone" is "4×25/125=0.8", whereas there is actually one actual (D131). Thus, the proportion of the difference between the actual number and the expected value with respect to the expected value is "(1−0.8)/0.8=0.25", so that neither of the absolute values exceeds 1.0. Therefore, the peculiar citation discriminating device 306 judges that there is no peculiar citation in the four texts that contain the characteristic "remote controller".

The peculiar citation discriminating device 306 repeats such processing for all the characteristics.

At last, the extraction result with peculiar citation output device 307 outputs each of the characteristics stored in the extraction result storage unit 203 with the peculiar citations of the texts containing the respective characteristics.

FIG. 17 shows an output example of this case.

Regarding the four texts containing the characteristic "screen", citations of the two texts are "e-mail" and citations of the two texts are "telephone". Therefore, there is no deviation observed in terms of the number of texts alone. However, citations of the texts stored in the text set storage unit 201 are deviated to "e-mail", so that "telephone" is discriminated and outputted as a peculiar citation. Further, regarding the four texts containing the characteristic "remote controller", citations of the three texts are "e-mail" and citation of one text is "telephone". Therefore, there is a deviation observed in terms of the number of texts alone. However, citations of the texts stored in the text set storage unit 201 are deviated to "e-mail", so that it is judged as having no deviation and nothing is outputted.

As described above, when there are an extremely larger number of texts of a certain citation appearing than a normal case or when there are an extremely smaller number of texts appearing than a normal case, it is possible with this EXAMPLE to output that citation as the peculiar citation.

Next, EXAMPLE 4 of the present invention will be described by referring to the drawings. This EXAMPLE corresponds to the fourth exemplary embodiment of the present invention shown in FIG. 7 and FIG. 8.

EXAMPLE 4 will also be described by using the same case as that of EXAMPLE 1. That is, described are the operations of the case where the user performs text mining by designating the category "fault", when the texts stored in the text set storage unit 201 shown in FIG. 12 are classified as in the category information storage unit 202 shown in FIG. 13.

As in the case of EXAMPLE 3, it is assumed in EXAMPLE 4 that there are one hundred twenty-five texts in total that are stored in the text set storage unit 201, and citations of one hundred texts among those are "e-mail" while citations of twenty-five texts are "telephone".

At this time, first, the characteristic expression extracting device 301 extracts a peculiar characteristic that belongs to the category "fault", relates the characteristic to the text that contains the characteristic, and records it to the extraction result storage unit 203 as the result of the text mining. This operation is the same as that of the characteristic expression extracting device 301 of EXAMPLE 1, and the result shown in FIG. 14 is recorded to the extraction result storage unit 203.

Subsequently, the divergence degree calculating device 308 obtains a set of texts containing each of the characteristics stored in the extraction result storage unit 203, and calculates the divergence degrees regarding the number of texts of each citation in that set, i.e., a value showing the extent of divergence between the actual number and the expected value thereof.

Here, used as the divergence degrees is a proportion of a difference between an actual number and an expected value with respect to the expected value. That is, provided that an expected value of the number of texts whose citation is "S" is "E" and the actual number of texts whose citation is "S" is "X" in a set of texts containing a certain characteristic "P", the divergence degree regarding the number of texts whose citations are "S" in the set of texts containing the characteristic "P" is "(X−E)/E".

The divergence degree calculating device 308 first calculates the divergence degrees regarding the number of texts of each citation in a set of texts that contain the characteristic "power supply".

First, the divergence degree calculating device 308 refers to the extraction result storage unit 203 shown in FIG. 14, and finds that the texts containing the characteristic "power supply" are five texts D1, D4, D9, D107, and D127.

Then, the divergence degree calculating device 308 calculates the expected value of the number of texts whose citations are "e-mail" among those five texts. Since there are one hundred twenty-five texts in total and citations of one hundred texts are "e-mail", the expected value of the number of texts whose citations are "e-mail" among the five texts containing the characteristic "power supply" becomes "5×100/125=4".

Further, it is found by referring to the text set storage unit 201 shown in FIG. 12 that the citations of three texts D1, D4, and D9 are actually "e-mail" among the five texts that contain the characteristic "power supply". Based on those values, the divergence degree calculating device 308 calculates the divergence degree regarding the number of texts whose citations are "e-mail" among the five texts containing the characteristic "power supply", and obtains a value "(3−4)/4=−0.25".

Subsequently, the divergence degree calculating device 308 calculates the expected value of the number of texts whose citations are "telephone" among the five texts that contain the characteristic "power supply". Since the citations of the twenty-five texts among the one hundred twenty-five texts are "telephone", the expected value of the number of texts whose citations are "telephone" among the five texts containing the characteristic "power supply" becomes "5×25/125=1".

Further, it is found by referring to the text set storage unit 201 shown in FIG. 12 that the citations of two texts D107 and D127 are actually "telephone" among the five texts that contain the characteristic "power supply". Based on those values, the divergence degree calculating device 308 calculates the divergence degree regarding the number of texts whose citations are "e-mail" among the five texts containing the characteristic "power supply", and obtains a value "(2−1)/1=1".

Then, the divergence degree calculating device 308 performs the same processing for the characteristic "screen".

Regarding the four texts (D3, D10, D123, D126) containing the characteristic "screen", the expected value of the number of texts whose citations are "e-mail" is "4×100/125=3.2", whereas there are actually two texts (D3 and D10) whose citations are "e-mail". Thus, the divergence degrees is calculated as "(2−3.2)/3.2=−0.375".

Further, regarding the four texts containing the characteristic "screen", the expected value of the number of texts whose citations are "telephone" is "4×25/125=0.8", whereas there are actually two texts (D123 and D126) whose citations are "telephone". Thus, the divergence degree is calculated as "(2−0.8)/0.8=1.5".

Regarding the three texts (D102, D104, D121) containing the next characteristic "inspection", the expected value of the number of texts whose citations are "e-mail" is "3×100/125=2.4", whereas there is actually no (0) text. Thus, the divergence degree is "(0−2.4)/2.4=−1". Further, the expected value of the number of texts whose citations are "telephone" is "3×25/125=0.6", whereas there are actually three texts. Thus, the divergence degree is "(3−0.6)/0.6=4".

Meanwhile, the expected value of the number of texts whose citations are "e-mail" regarding the four texts (D7, D11, D15, D131) containing the next characteristic "remote controller" is "4×100/125=3.2", whereas there are actually three texts (D7, D11, D15). Thus, the divergence degree is "(3−3.2)/3.2=−0.0625". Further, the expected value of the number of texts whose citations are "telephone" is "4×25/125=0.8", whereas there is actually one text (D131). Thus, the divergence degree is "(1−0.8)/0.8=0.25".

The divergence degree calculating device 308 repeats such processing for all the characteristics.

At last, the extraction result with divergence degree output device 309 outputs each of the characteristics stored in the extraction result storage unit 203 with the divergence degree by each citation.

FIG. 18 shows an output example of this case. In this case, the divergence degrees by each citation are shown in a form of a bar graph which takes the lateral axis as the divergence degrees for each characteristic. In FIG. 18, a longitudinal line 50 indicates the position of "0" divergence degree, and the degree of the divergence between the actual number of texts and the expected value is greater as the graph extends in the left and right sides from that line. Further, according to the way of obtaining the divergence degree used in this EXAMPLE, the graph extended in the right side means that the actual number exceeds the expected value, while the graph extended in the left side means that the actual number is below the expected value.

Compared to the output of EXAMPLE 3 shown in FIG. 17, the user can know the extent of divergence between the number of the texts of that citation and the expected value from the output of FIG. 18. In the case of FIG. 18, it is possible to know that the degree of divergence between the expected value and the number of texts which contain the characteristic "inspection" and whose citations are "telephone" is greater than those of the others. With this, it can be found that the characteristic "inspection" may possibly be an abnormal result, so that the user can realize that there may be recognition errors in the speech recognition.

As described above, when there are an extremely larger number of texts of a certain citation appearing than a normal case or when there are an extremely smaller number of texts appearing than a normal case, it is possible with this EXAMPLE to output that citation as the peculiar citation.

Next, EXAMPLE 5 of the present invention will be described by referring to the drawings. This EXAMPLE corresponds to the fifth exemplary embodiment of the present invention shown in FIG. 9 and FIG. 10.

Here, the operations of the exemplary embodiment according to the present invention will be described by referring to a case where: a survey regarding impressions of a certain product is conducted on twelve hundred people; the answers are classified according to whether or not the respondents are interested in the product, sex of the respondents, ages of the respondents, and occupations of the respondents; and characteristics in the responses of the respondents that are interested in the product are extracted.

It is assumed here that there are eight hundred texts of D1-D800 stored in the text set storage unit 204.

These texts are classified according to four classification axes of "interest for Product", "sex", "age", and "occupation". It is assumed that the classification axis "interest for product" has two categories of "interested" and "not interested", the classification axis "sex" has two categories of "female" and "male", the classification axis "age" has four categories of "20's", 30's", "40's", and "50 s", and the classification axis "occupation" has four categories of "student", "company employee", "housewife", and "others". Further, it is assumed that the numbers of texts in each category are as in FIG. 19.

FIG. 20 shows an example of the category information storage unit 205 of this case. In this case, the categories to which each of the texts belongs are stored by each of the classification axes.

At this time, first, the characteristic expression extraction device 301 receives, from the user through the input device 1, designation of the target category for which the characteristics are extracted by text mining.

Here, the user designates the category "interested" in the classification axis "interest for product".

The characteristic expression extracting device 301 then executes extraction of a peculiar characteristic that belongs to the category "interested" in the classification axis "interest for product" among the set of texts stored in the text set storage unit 204, relates the characteristic and the text containing the characteristic, and records it to the extraction result storage unit 203 as the result of the text mining.

Here, it is assumed that the characteristic expression extracting device 301 extracts words that appear in the texts, and records the characteristics as in FIG. 21 to the extraction result storage unit 203. Even though not all the texts containing each of the characteristics are shown in FIG. 21, it is assumed that there are two hundred eighty-three texts that contain the characteristic "performance", two hundred fifty-four texts that contain the characteristic "design", two hundred twenty-four texts that contain the characteristic "price", and one hundred fifty-five texts that contain the characteristic "size" among the eight hundred texts in total. Further, explanations hereinafter will be presented assuming that details of the number of texts containing each characteristic by each category regarding the classification axis "sex", the classification axis "age", and the classification axis "occupation" are as in FIG. 22, FIG. 23, and FIG. 24, respectively.

Following the processing executed by the characteristic expression extracting device 301, the associated classification axis discriminating device 310 discriminates, for each of the classification axes stored in the category information storage unit 205, whether or not there is an association between whether or not the texts contain each of the characteristics stored in the extraction result storage unit 203 and the categories to which the texts belong.

Here, whether or not there is an association between whether or not the text contains a certain characteristic and the category of a certain classification axis to which the text belongs is checked by using a chi-square ($\chi$) test by setting 1% as a significant level.

First, the associated classification axis discriminating device 310 discriminates, for each of the classification axes stored in the category information storage unit 205, whether or not there is an association between whether or not the texts contain the characteristic "performance" and the category to which the texts belong.

Here, the test regarding the classification axis "sex" will be described.

When all the eight hundred texts are classified based on whether or not the texts contain the characteristic "performance and based on the categories belonging to the classification axis "sex", the number of texts as the results of the classifications are as in FIG. 25, respectively, based on the number of texts containing the characteristic "performance" by each category as shown in FIG. 22 and the number of the whole texts by each category as shown in FIG. 19.

Meanwhile, the proportion of the texts containing the characteristic "performance" among the whole texts is "283/800", and the proportion of the texts belonging to the category "female" in the classification axis "sex" is "384/800". Thus, the expected value of the number of texts which contain the characteristic "performance" and belong to the category "female" in the classification axis "sex" is "800×283/800× 384/800=135.84". The expected values of each item in FIG. 25 are obtained as in FIG. 26.

When the chi-square value of this case is calculated from FIG. 25 and FIG. 26, the obtained value is 0.32. The higher-side probability in the chi-square distribution with one-degree of freedom is 57.0%, which exceeds the significant level 1%. Thus, the associated classification axis discriminating device 310 judges that there is no association between whether or not the texts contain the characteristic "performance" and the category in the classification axis "sex" to which the texts belong.

In the same manner, the chi-square value becomes 2.39 regarding whether or not the texts contain the characteristic "performance" and the category in the classification axis "age" to which the texts belong. The higher-side probability in the chi-square distribution with three-degree of freedom is 49.5%, which exceeds the significant level 1%. Thus, the associated classification axis discriminating device 310 judges that there is no association between whether or not the texts contain the characteristic "performance" and the category in the classification axis "age" to which the texts belong.

Further, the chi-square value becomes 3.06 regarding whether or not the texts contain the characteristic "performance" and the category in the classification axis "occupation" to which the texts belong. The higher-side probability in the chi-square distribution with three-degree of freedom is 38.3%, which exceeds the significant level 1%. Thus, the associated classification axis discriminating device 310 judges that there is no association between whether or not the texts contain the characteristic "performance" and the category in the classification axis "occupation" to which the texts belong.

The classification axis "interest for product" is the classification axis the user designated as the mining target, so that the associated classification axis discriminating device 310 does not take this classification axis as the target of processing.

As a result, the associated classification axis discriminating device 310 judges that there is no classification axis that is associated with whether or not the texts contain the characteristic "performance".

Therefore, the peculiar category discriminating device 311 performs no processing for the characteristic "performance".

Then, the associated classification axis discriminating device 310 discriminates, for each of the classification axes stored in the category information storage unit 205, whether or not there is an association between whether or not the texts contain the characteristic "design" and the category to which the texts belong.

The chi-square value becomes 19.54 regarding whether the texts contain the characteristic "design" and the category in the classification axis "sex" to which the texts belong. The higher-side probability in the chi-square distribution with one-degree of freedom is 0.0%, which is below the significant level 1%. Thus, the associated classification axis discriminating device 310 judges that there is association between whether or not the texts contain the characteristic "design" and the category in the classification axis "sex" to which the texts belong.

In the meantime, the chi-square value becomes 6.95 regarding whether or not the texts contain the characteristic "deign" and the category in the classification axis "age" to which the texts belong. The higher-side probability in the chi-square distribution with three-degree of freedom is 7.3%, which exceeds the significant level 1%. Thus, the associated classification axis discriminating device 310 judges that there is no association between whether or not the texts contain the characteristic "design" and the category in the classification axis "age" to which the texts belong.

Further, the chi-square value becomes 3.66 regarding whether or not the texts contain the characteristic "design" and the category in the classification axis "occupation" to which the texts belong. The higher-side probability in the chi-square distribution with three-degree of freedom is 30.0%, which exceeds the significant level 1%. Thus, the associated classification axis discriminating device 310 judges that there is no association between whether or not the texts contain the characteristic "design" and the category in the classification axis "occupation" to which the texts belong.

Based on the results, the associated classification axis discriminating device 310 discriminates the classification axis "sex" as the classification axis that is associated with the fact whether or not the texts contain the characteristic "design".

Upon this, the peculiar category discriminating device 311 discriminates a peculiar category from the categories of the classification axis "sex" in the set of texts containing the characteristic "design".

In this EXAMPLE, only the category that has the number of belonging texts greatly exceeding its expected value is discriminated as the peculiar category. Further, it is so defined that whether or not there is a divergence between the expected value and the actual number depending on whether or not the proportion of the absolute value of the difference between the actual number and the expected value with respect to the expected value exceeds a preset threshold value.

That is, provided that an expected value of the number of texts that belong to category "C" is "E" and the actual number of texts that belong to the category "C" is "X" in a set of texts containing a certain characteristic "P", the category "C" is discriminated as a peculiar category in the set of texts containing the characteristic "P", when the value of "(X−E)/E" is positive and exceeds a threshold value 0.2.

According to FIG. 22, among the two hundred fifty-four texts containing the characteristic "design", there are one hundred fifty-one texts that belong to the category "female", while there are one hundred and three texts that belong to the category "male". Further, according to FIG. 19, among the whole texts, the proportion of the texts belonging to the category "female" is "384/800", and the proportion of the texts belonging to the category "male" is "416/800". Thus, among the two hundred fifty-four texts containing the characteristic "design", the expected value for the number of texts that belong to the category "female" is "254×384/800=121.92", and the expected value for the number of texts that belong to the category "male" is "254×416/800=132.08". Therefore, the proportion of the difference between the actual number and the expected value with respect to the expected value is calculated as 0.24 for the category "female" and as −0.22 for the category "male.

For the category "female", the value is positive and exceeds the threshold value 0.2. Therefore, the peculiar category discriminating device 311 discriminates the category "female" as the peculiar category out of the categories of the classification axis "sex".

The associated classification axis discriminating device 310 also discriminates, for the remaining classification axes "age" and "occupation", whether or not there is an association between whether or not the texts contain the characteristic "design" and the category to which the texts belong.

The chi-square value becomes 6.95 regarding whether or not the texts contain the characteristic "design" and the category in the classification axis "age" to which the texts belong. The higher-side probability in the chi-square distribution with three-degree of freedom is 7.3%, which exceeds the significant level 1%. Thus, the associated classification axis discriminating device 310 judges that there is no association between whether or not the texts contain the characteristic "design" and the category in the classification axis "age" to which the texts belong.

Further, the chi-square value becomes 3.66 regarding whether or not the texts contain the characteristic "design" and the category in the classification axis "occupation" to which the texts belong. The higher-side probability in the chi-square distribution with three-degree of freedom is 30.0%, which exceeds the significant level 1%. Thus, the associated classification axis discriminating device 310 judges that there is no association between whether or not the texts contain the characteristic "design" and the category in the classification axis "occupation" to which the texts belong.

Subsequently regarding the characteristic "price" and the characteristic "size", the associated classification axis discriminating device 310 discriminates, by each of the classification axes stored in the category information storage unit 205, whether or not there is an association between whether or not the texts contain those characteristics and the category to which the texts belong to.

The associated classification axis discriminating device 310 performs the same processing as the processing described above on the characteristic "price", and discriminates the classification axis "occupation" as the associated classification axis. With this, the peculiar category discriminating device 311 discriminates the category "student" as the peculiar category among the categories of the classification axis "occupation".

The associated classification axis discriminating device 310 judges that there is no classification axis that is associated with the characteristic "size". Therefore, the peculiar category discriminating device 311 performs no processing for the characteristic "price".

Thereafter, the associated classification axis discriminating device 310 and the peculiar category discriminating device 311 repeat such processing for all the characteristics.

At last, the extraction result with peculiar category output device 312 outputs each of the characteristics stored in the extraction result storage unit 203 with the peculiar category by each citation.

FIG. 27 shows an output example of this case.

Whether or not the texts contain the characteristic "design" is strongly associated with the category to which the texts belong in the classification axis "sex". Particularly, the number of texts that belong to the category "female" greatly exceeds the expected value, so that "female" is outputted as the peculiar category for the characteristic "design". Further, whether or not the texts contain the characteristic "price" is strongly associated with the category to which the texts belong in the classification axis "occupation". Particularly, the number of texts that belong to the category "student" greatly exceeds the expected value, so that "student" is outputted as the peculiar category for the characteristic "price".

This makes it possible for the user to know that "design" among the extracted characteristics appears in the answers from the female respondents in a deviated manner, and "price" appears in the answers from the student respondents in a deviated manner.

Next, other exemplary embodiments of the present invention will be described one by one.

In the above-described text mining device, the citation information may be defined as the information which specifies the main citation of the texts that contain the characteristic.

With this, it is possible to show the user whether the characteristic extracted by text mining is in common to all the texts regardless of the citations or is observed only in the texts of a specific citation in a deviated manner, when the mining-target texts are a plurality of kinds of texts of different citations.

In the above-described text mining device, the citation information may be defined as the structural ratio by each citation of the texts containing the characteristic.

With this, it is possible to show the user the degrees of deviations between the citations regarding the number of texts where the characteristic extracted by the text mining appears, when the mining-target texts are a plurality of kinds of texts of different citations.

In the above-described text mining device, the citation information may be defined as the information which specifies the citation that has the number of texts largely diverted from the proper value based on the number of texts by each citation in the entire set of the texts containing the characteristic.

With this, when the characteristic extracted by the text mining appears in the texts of a specific citation in a more largely deviated manner than a normal case even if there is a deviation in the number of texts of each citation, it is possible to show the user that information, in the case where the mining-target texts are configured with a plurality of kinds of texts of different citations.

In the above-described text mining device, the citation information may be defined as the information which specifies the degrees of divergence with respect to the proper value based on the number of texts by each citation in the entire set of the texts that contain the characteristic.

With this, it is possible to show the user the extent of deviation between the actual number of the texts where the characteristic extracted by the text mining appears and the number when assumed that the characteristic appears in each text regardless of the citations, in the case where the mining-target texts are a plurality of kinds of texts of different citations.

Further, a text mining method may extract characteristics from the set of texts collected from a plurality of citations, create the citation information of the texts that contain the characteristics, and output the characteristics and the citation information in a corresponding manner.

With the above-described text mining method, it is possible to present the user each of the characteristics extracted from the text set and the information regarding the citations of the texts that contain the characteristics in a corresponding manner.

Therefore, it is possible to show the user whether the characteristic extracted by text mining is in common to all the texts regardless of the citations or is observed only in the texts of a specific citation in a deviated manner, when the mining-target texts are a plurality of kinds of texts of different citations.

In the above-described text mining method, the citation information may be defined as the information which specifies the main citation of the texts that contain the characteristics.

With this, it is possible to show the user whether the characteristic extracted by text mining is in common to all the texts regardless of the citations or is observed only in the texts of a specific citation in a deviated manner, when the mining-target texts are a plurality of kinds of texts of different citations.

In the above-described text mining method, the citation information may be defined as the structural ratio by each citation of the texts that contain the characteristic.

With this, it is possible to show the user the degrees of deviations between the citations regarding the number of texts where the characteristic extracted by the text mining appears, when the mining-target texts are a plurality of kinds of texts of different citations.

In the above-described text mining method, the citation information may be defined as the information which specifies the citation that has the number of texts largely diverted from the proper value based on the number of texts by each citation in the entire set of the texts containing the characteristic.

With this, when the characteristic extracted by the text mining appears in the texts of a specific citation in a more largely deviated manner than a normal case even if there is a deviation in the number of texts of each citation, it is possible to show the user that information, in the case where the mining-target texts are a plurality of kinds of texts of different citations.

In the above-described text mining method, the citation information may be defined as the information which specifies the degrees of divergence with respect to the proper value based on the number of texts by each citation in the entire set of the texts containing the characteristic.

With this, it is possible to show the user the extent of deviation between the actual number of the texts where the characteristic extracted by the text mining appears and the number when assumed that the characteristic appears in each text regardless of the citations, in the case where the mining-target texts are a plurality of kinds of texts of different citations.

In the above-described text mining program, the citation information may be defined as the information which specifies the main citation of the texts that contain the characteristic.

With this, it is possible to show the user whether the characteristic extracted by text mining is in common to all the texts regardless of the citations or is observed only in the texts of a specific citation in a deviated manner, when the mining-target texts are a plurality of kinds of texts of different citations.

In the above-described text mining program, the citation information may be defined as the structural ratio by each citation of the texts that contain the characteristic.

With this, it is possible to show the user the degrees of deviations between the citations regarding the number of texts where the characteristic extracted by the text mining appears, when the mining-target texts are a plurality of kinds of texts of different citations.

In the above-described text mining program, the citation information may be defined as the information which specifies the citation that has the number of texts largely diverted from the proper value based on the number of texts by each citation in the entire set of the texts containing the characteristic. With this, when the characteristic extracted by the text mining appears in the texts of a specific citation in a more largely deviated manner than a normal case even if there is a deviation in the number of texts of each citation, it is possible to show the user that information, in the case where the mining-target texts are a plurality of kinds of texts of different citations.

In the above-described text mining program, the citation information may be defined as the information which specifies the degrees of divergence with respect to the proper value based on the number of texts by each citation in the entire set of the texts containing the characteristic.

With this, it is possible to show the user the extent of deviation between the actual number of the texts where the characteristic extracted by the text mining appears and the number when assumed that the characteristic appears in each text regardless of the citations, in the case where the mining-target texts are a plurality of kinds of texts of different citations.

Each of the above-described exemplary embodiments are merely presented as concretive examples of the present invention, and it is to be understood that various modifications are possible within the scope of the present invention depicted in the appended claims.

INDUSTRIAL APPLICABILITY

The present invention can be applied to a mining system and a program for achieving the mining system which extracts effective information such as malfunctioning information and problems from data of inquiries recorded at call centers and from paper document data such as reports. Further, the present invention can also be applied to a usage such as a system which builds Q&A collections by accumulating contents of inquiries as texts, and extracting frequently appearing inquiries therefrom.

BRIEF DESCRIPTION OF THE DRAWINGS

FIG. 12 is an illustration showing an example of a text set storage unit;

FIG. 13 is an illustration showing an example of a category information storage unit;

FIG. 14 is an illustration showing an example of an extraction result storage unit;

FIG. 15 is an illustration showing an example of an output of an extraction result with main citation output device;

FIG. 16 is an illustration showing an example of an output of an extraction result with structural ratio output device;

FIG. 17 is an illustration showing an example of an output of an extraction result with peculiar citation output device;

FIG. 18 is an illustration showing an example of an output of an extraction result with divergence degree output device;

FIG. 19 is an illustration showing the number of texts by each category;

FIG. 20 is an illustration showing an example of a category information storage unit;

FIG. 21 is an illustration showing an example of an extraction result storage unit;

FIG. 22 is an illustration showing details of the number of texts containing each characteristic by each category in a classification axis "sex";

FIG. 23 is an illustration showing details of the number of texts containing each characteristic by each category in a classification axis "age";

FIG. 24 illustration showing details of the number of texts containing each characteristic by each category in a classification axis "occupation";

FIG. 26 is an illustration showing expected values of the respective number of texts when the whole texts are classified according to whether or not the texts contain a characteristic "performance" and according to categories of the classification axis "sex" to which the text belong; and FIG. 27 is an illustration showing an example of an output of an extraction result with peculiar citation output device.

REFERENCE NUMERALS

Figure 1:
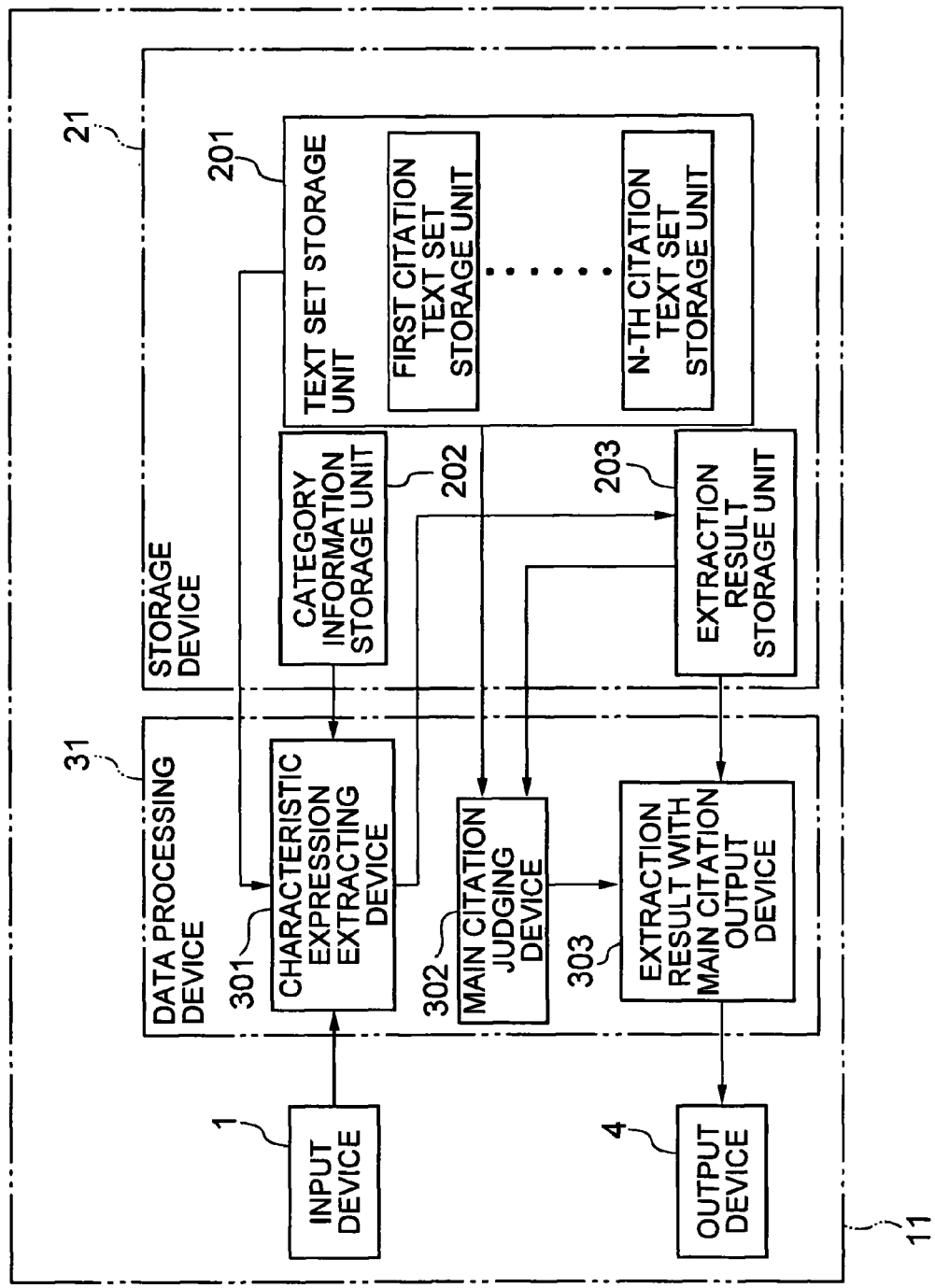
FIG. 1 is a block diagram showing the structure of a first exemplary embodiment.
Figure 2:
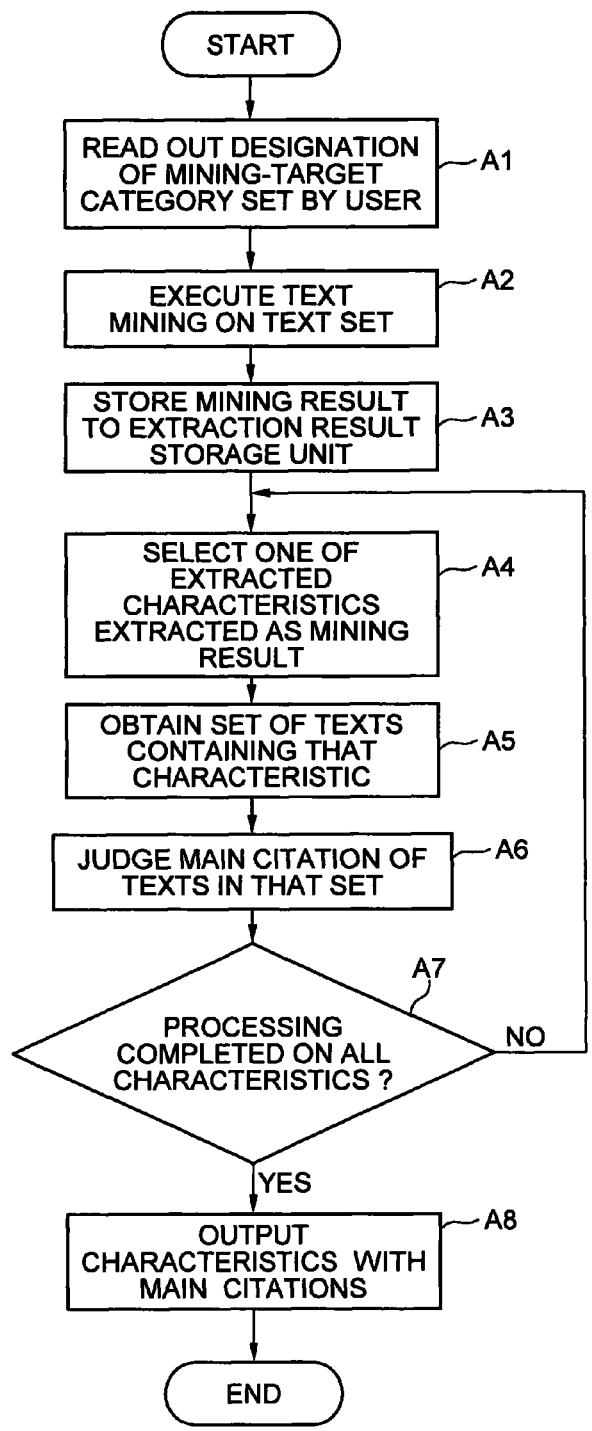
FIG. 2 is a flowchart showing the operations of the first exemplary embodiment.
Figure 3:
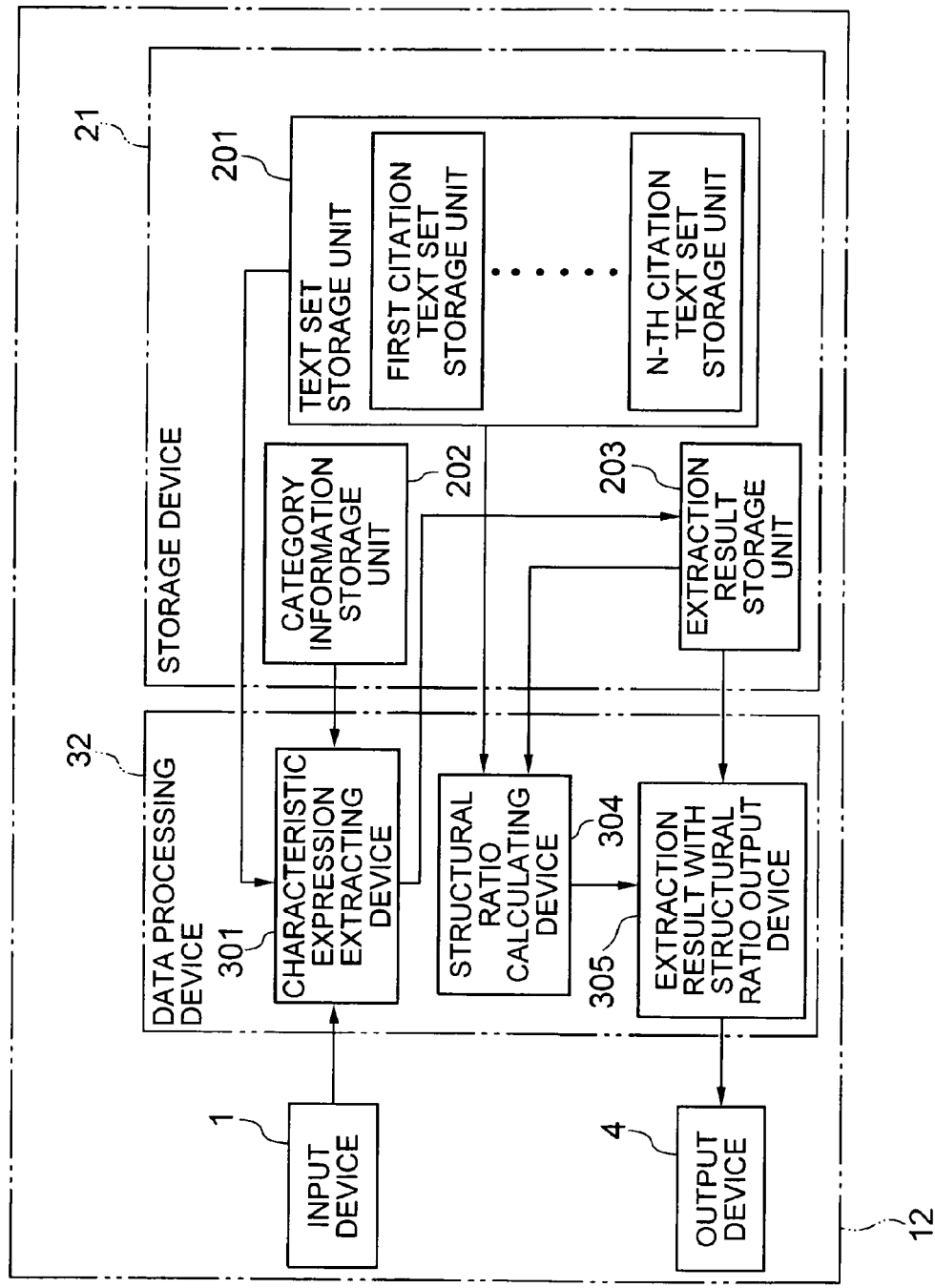
FIG. 3 is a block diagram showing the structure of a second exemplary embodiment.
Figure 4:
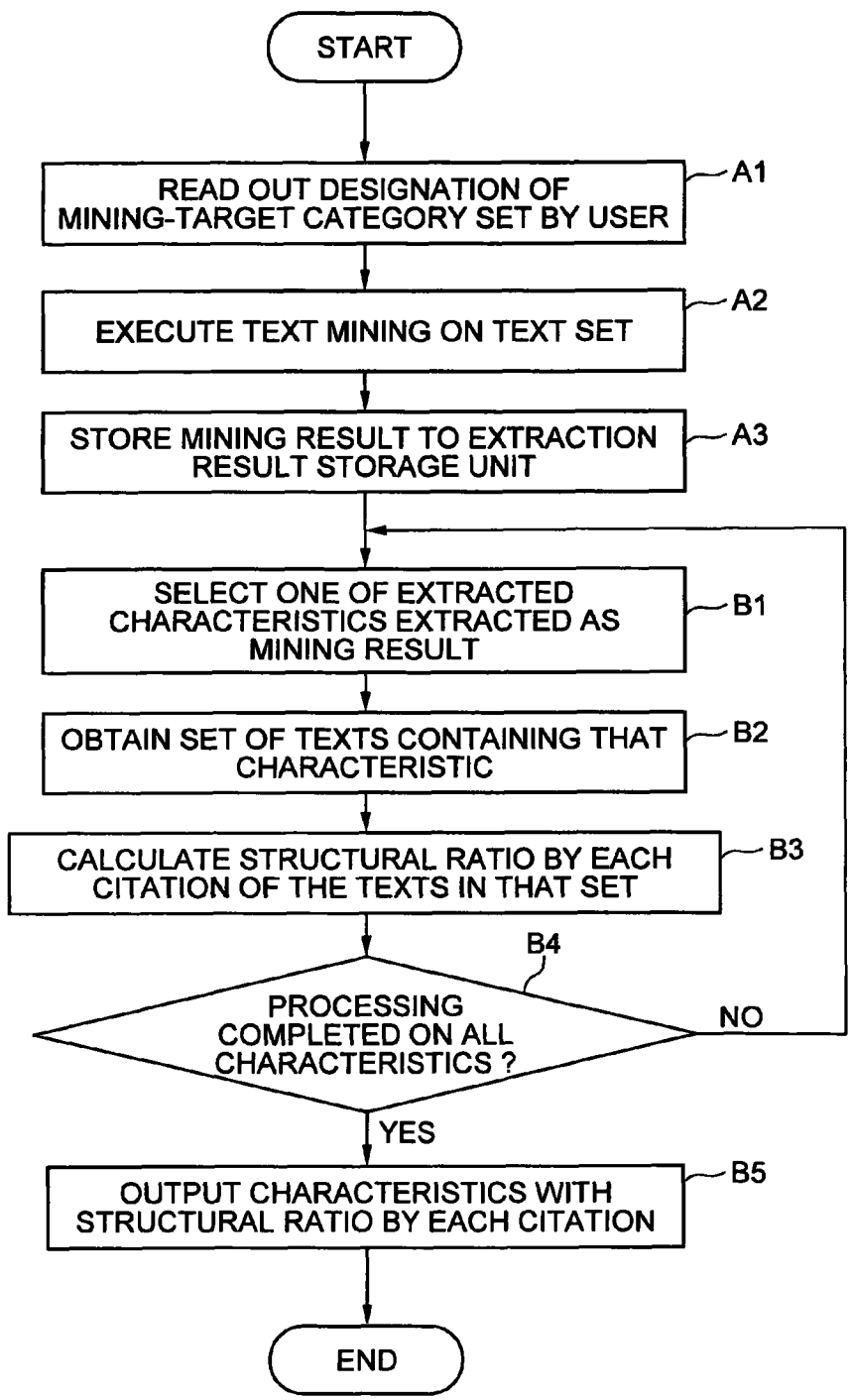
FIG. 4 is a flowchart showing the operations of the second exemplary embodiment.
Figure 5:
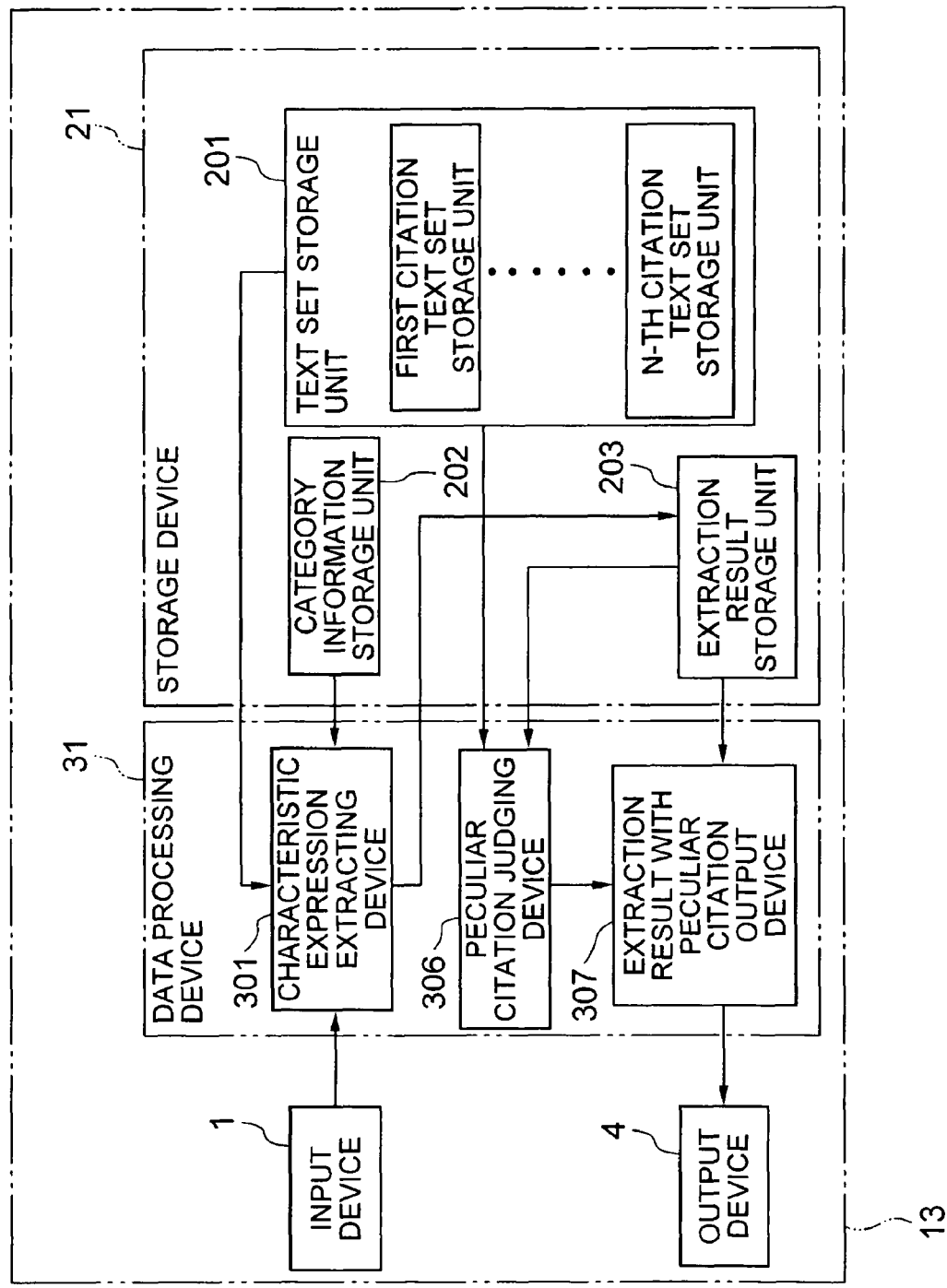
FIG. 5 is a block diagram showing the structure of a third exemplary embodiment.
Figure 6:
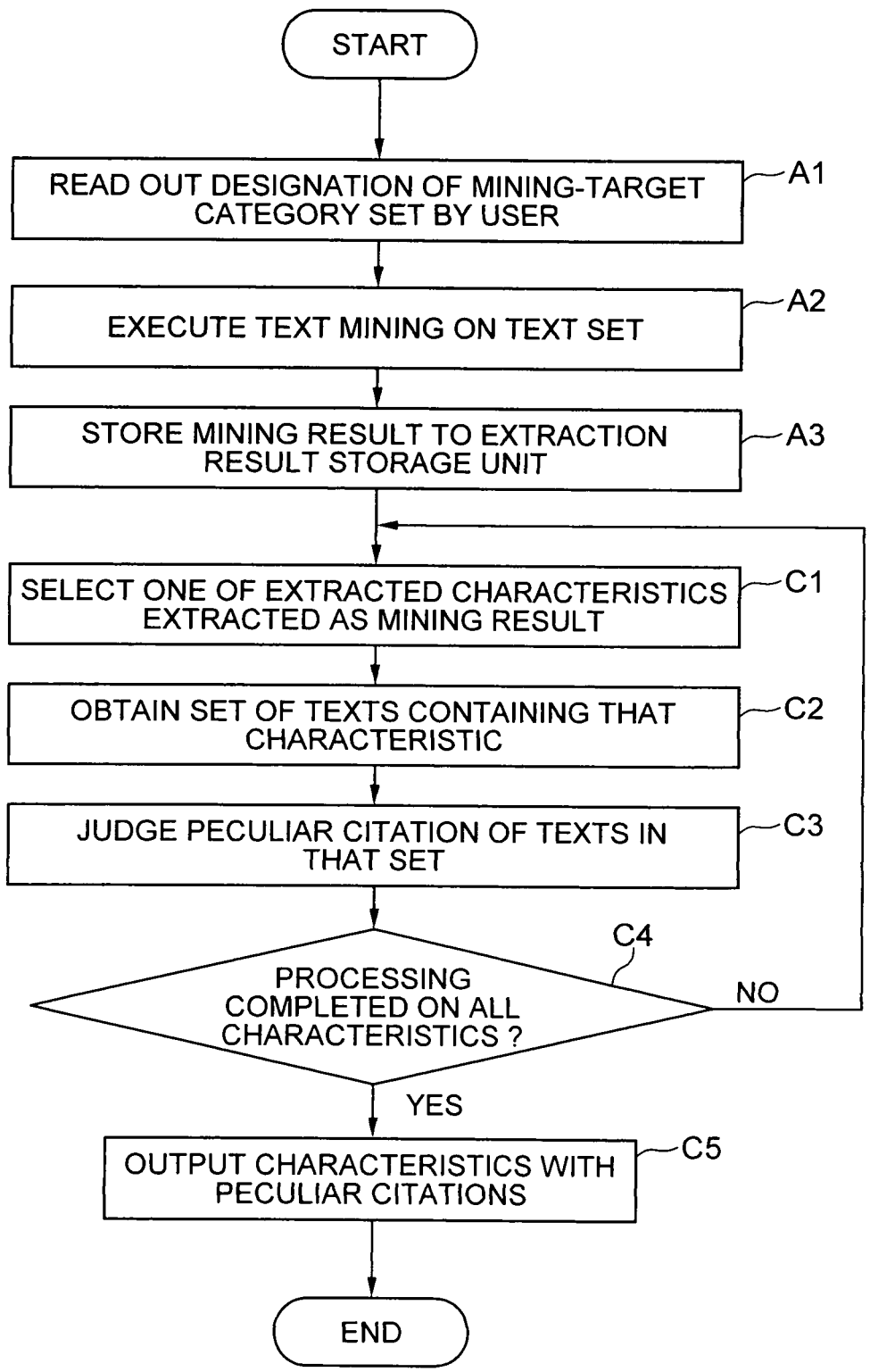
FIG. 6 is a flowchart showing the operations of the third exemplary embodiment.
Figure 7:
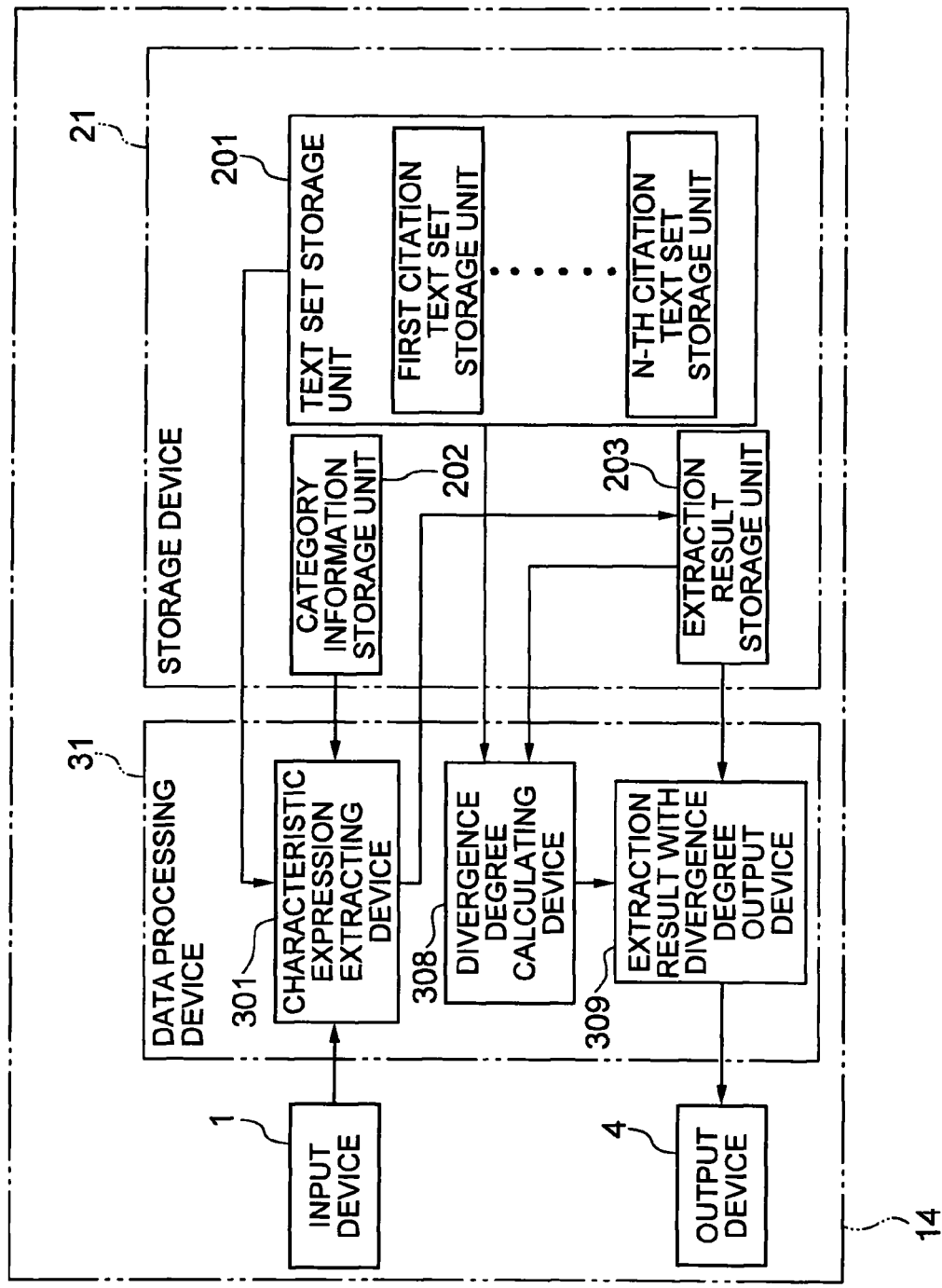
FIG. 7 is a block diagram showing the structure of a fourth exemplary embodiment.
Figure 8:
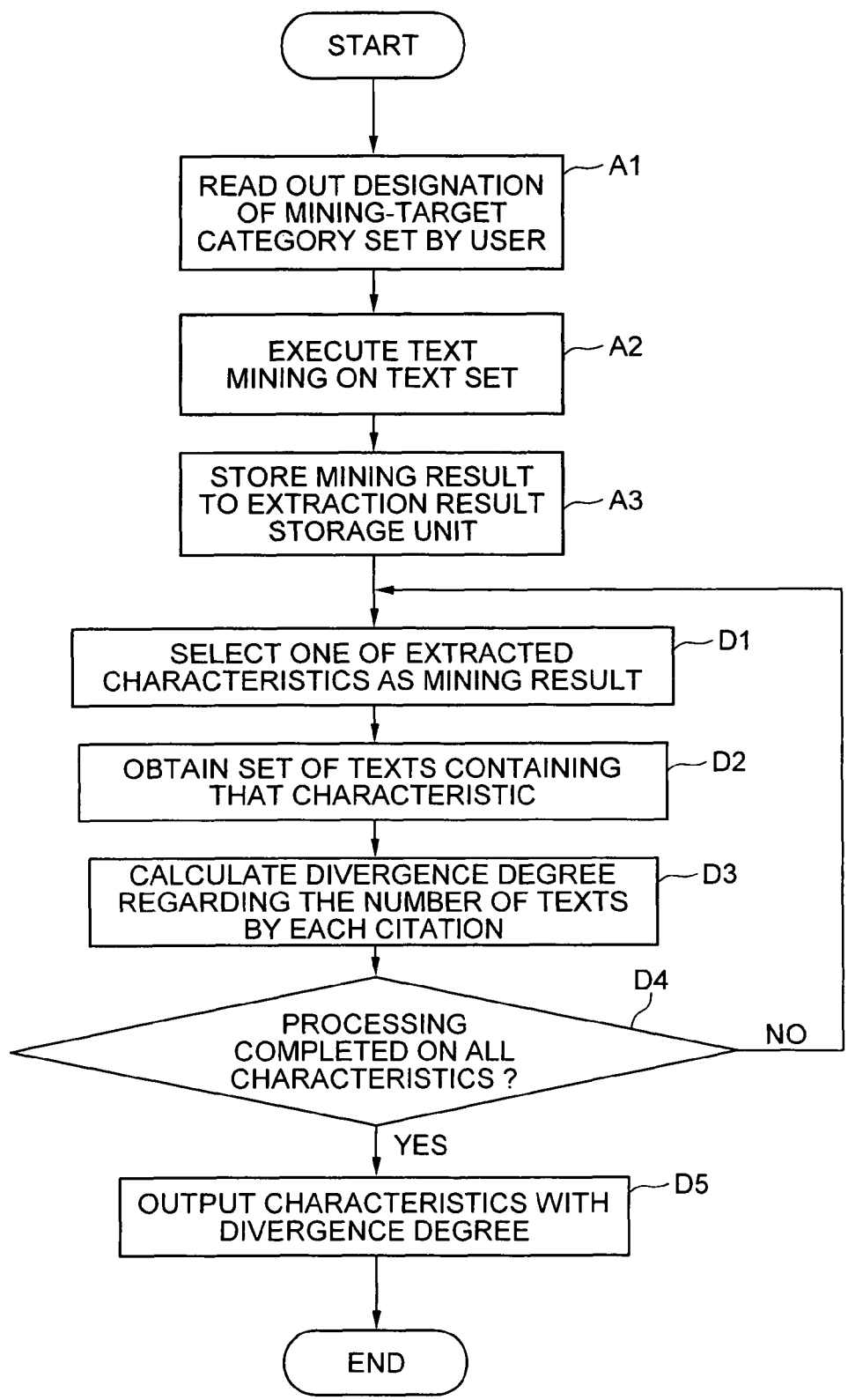
FIG. 8 is a flowchart showing the operations of the fourth exemplary embodiment.
Figure 9:
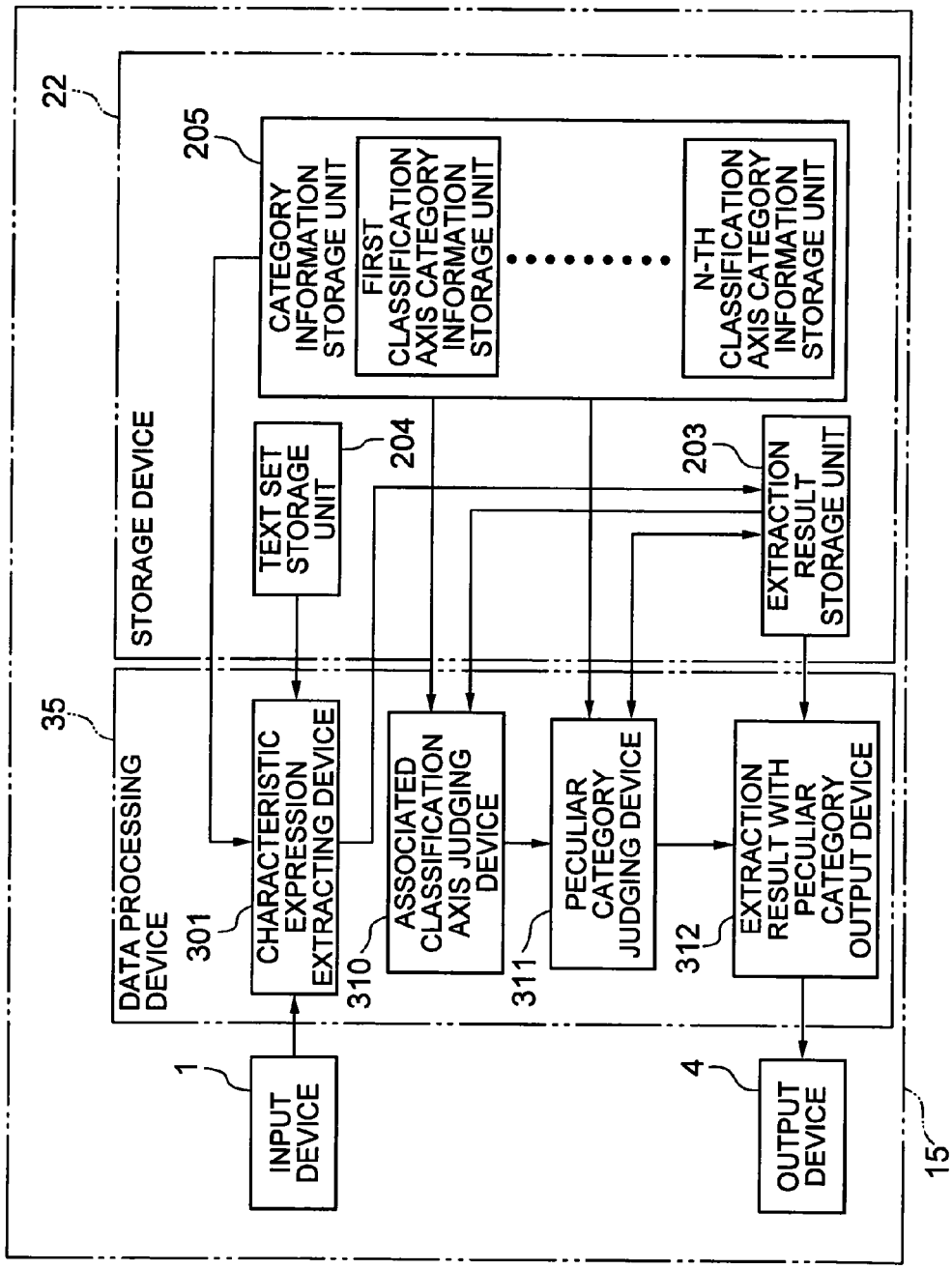
FIG. 9 is a block diagram showing the structure of a fifth exemplary embodiment.
Figure 10:
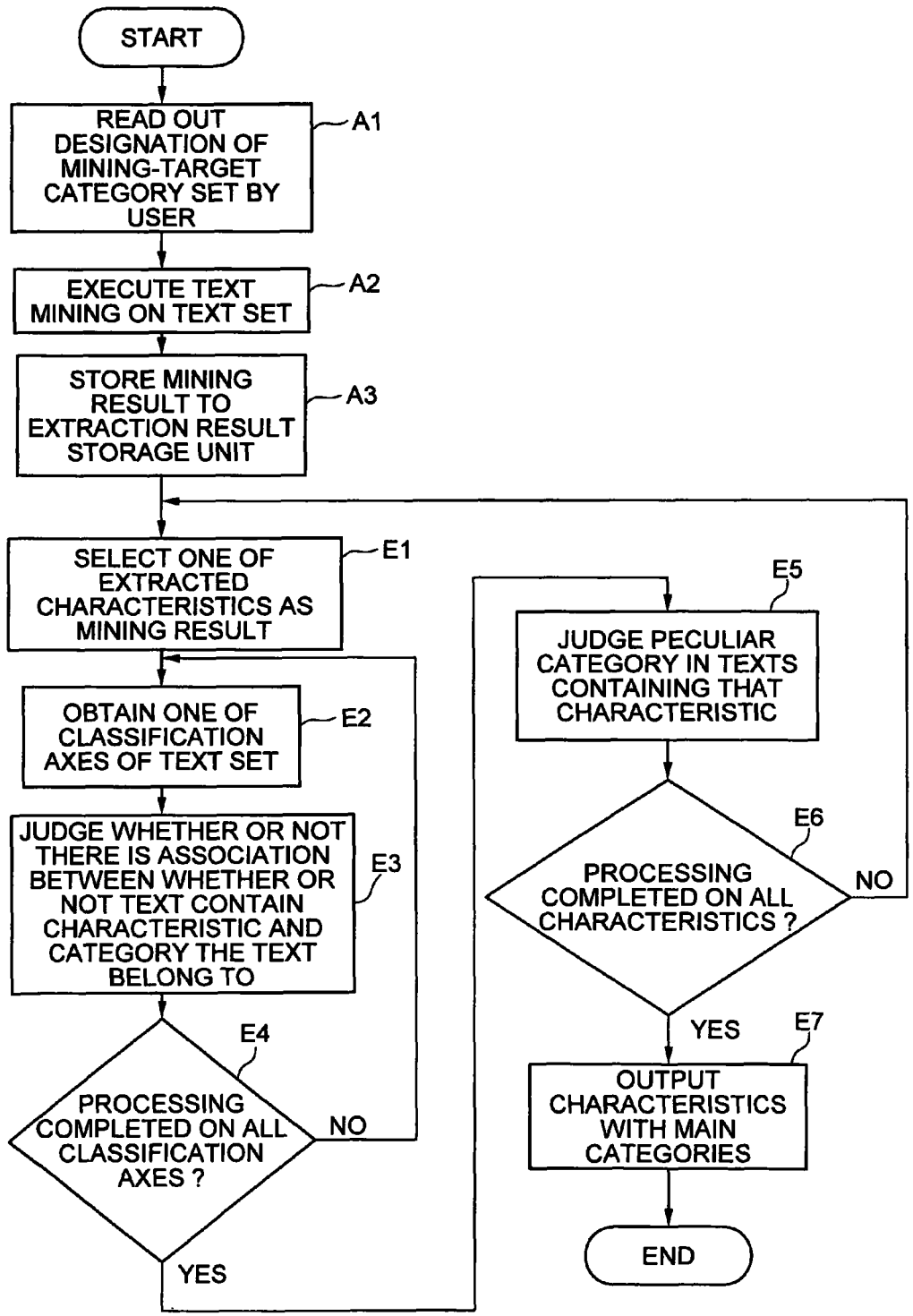
FIG. 10 is a flowchart showing the operations of the fifth exemplary embodiment.
Figure 11:
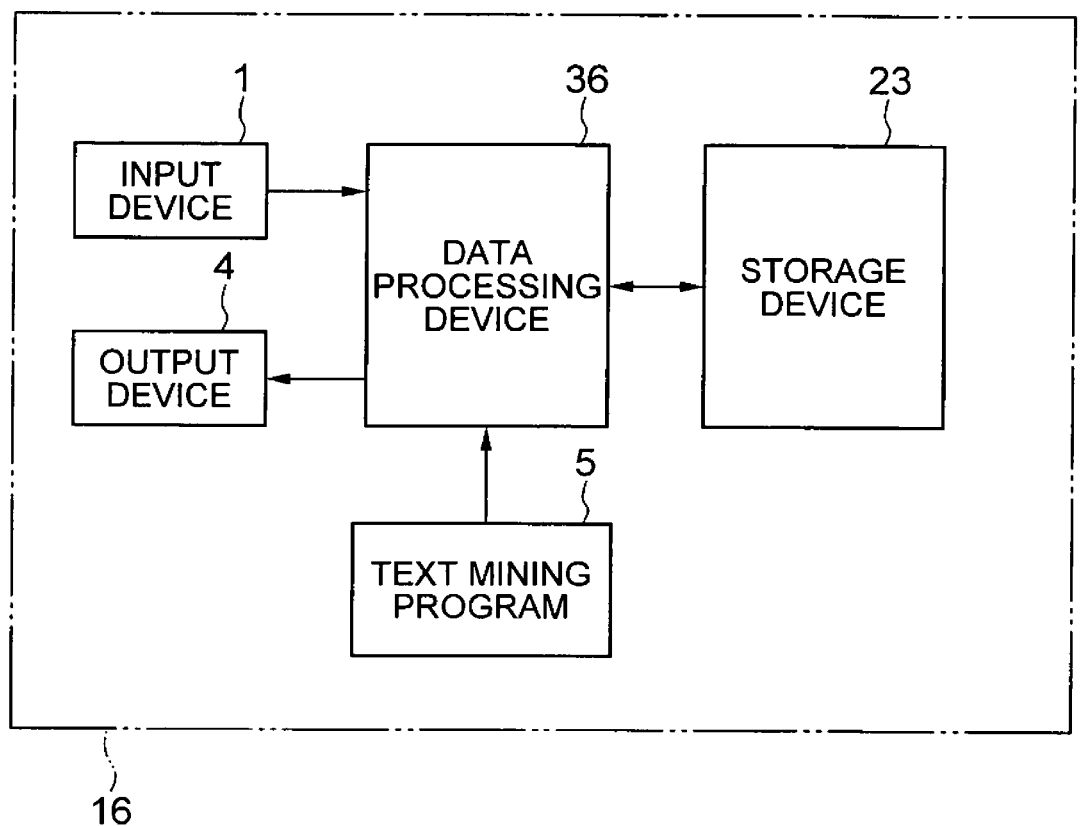
FIG. 11 is a block diagram showing the structure of a sixth exemplary embodiment.
Figure 25:
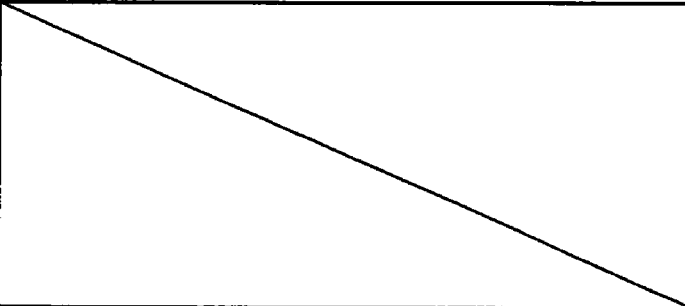
FIG. 25 is an illustration showing the respective number of texts when the whole texts are classified according to whether or not the texts contain a characteristic "performance" and according to categories of the classification axis "sex" to which the text belong.

1 Input device
4 Output device
5 Text mining program
11 Text mining device
12 Text mining device
13 Text mining device
14 Text mining device
15 Text mining device
16 Computer
21 Storage device
22 Storage device
23 Storage device
25 Expected value
31 Data processing device
32 Data processing device
33 Data processing device
34 Data processing device
35 Data processing device
36 Data processing device
201 Text set storage unit
202 Category information storage unit
203 Extraction result storage unit
204 Text set storage unit
205 Category information storage unit
301 Characteristic expression extracting device
302 Main citation discriminating device
303 Extraction result with main citation output device
304 Structural ratio calculating device
305 Extraction result with structural ratio output device
306 Peculiar citation discriminating device
307 Extraction result with peculiar citation output device
308 Divergence degree calculating device
309 Extraction result with divergence degree output device
310 Associated classification axis discriminating device
311 Peculiar category discriminating device 312 Extraction result with peculiar category output device

The invention claimed is:

1. A text mining device comprising a storage device which stores a set of texts classified according to a plurality of classification axes and a data processing device, wherein:

the data processing device comprises a characteristic expression extracting device, an associated classification axis discriminating device, a peculiar category discriminating device, and an extraction result with peculiar category output device;

the characteristic expression extracting device performs text mining on the set of texts read out from the storage device and extracts characteristics of the set of texts of a designated category;

the associated classification axis discriminating device discriminates from the plurality of classification axes, by each of the characteristics extracted by the characteristic expression extracting device, a classification axis that is strongly associated with whether or not the text contains the characteristic;

the peculiar category discriminating device discriminates the category of the classification axis discriminated by the associated classification axis discriminating device, which has the number of belonging texts largely diverted from a proper value considering the number of texts, by each of the categories of the classification axis in the entire set of the texts that contain the characteristics; and the extraction result with peculiar category output device relates the characteristic extracted by the characteristic expression extracting device to the category discriminated by the peculiar category discriminating device, judges whether the characteristics appear in a specific citation in a deviated manner, outputs the characteristics and the specific citation in a corresponding manner when the characteristics appear in the specific citation in a deviated manner, and outputs the characteristics as not being related to the specific citation when there is no deviation to the specific citation in the text containing the characteristics.

2. A text mining method for use of a text mining device comprising a storage device which stores a set of texts classified according to a plurality of classification axes and a data processing device comprising a characteristic expression extracting device, an associated classification axis discriminating device, a peculiar category discriminating device, and an extraction result with peculiar category output device, the method comprising:

performing, via the characteristic expression extracting device, text mining on the set of texts read out from the storage device;

extracting, via the characteristic expression extracting device, characteristics of the set of texts of a designated category;

discriminating, via the associated classification axis discriminating device, from the plurality of classification axes, by each of the characteristics extracted by the characteristic expression extracting device, a classification axis that is strongly associated with whether or not the text contains the characteristic;

discriminating, via the peculiar category discriminating device, the category of the classification axis discriminated by the associated classification axis discriminating device, which has the number of belonging texts largely diverted from a proper value considering the number of texts, by each of the categories of the classification axis in the entire set of the texts that contain the characteristics;

relating, via the extraction result with peculiar category output device, the characteristic extracted by the characteristic expression extracting device to the category discriminated by the peculiar category discriminating device;

judging, via the extraction result with peculiar category output device, whether the characteristics appear in a specific citation in a deviated manner; and outputting, via the extraction result with peculiar category output device, the characteristics and the specific citation in a corresponding manner when the characteristics appear in the specific citation in a deviated manner, and outputting the characteristics as not being related to the specific citation when there is no deviation to the specific citation in the text containing the characteristics.

3. A non-transitory computer readable recording medium storing a program which enables a computer to execute a text mining method for use of a text mining device comprising a storage device which stores a set of texts classified according to a plurality of classification axes and a data processing device comprising a characteristic expression extracting device, an associated classification axis discriminating device, a peculiar category discriminating device, and an extraction result with peculiar category output device, the computer executing:

a function of performing, via the characteristic expression extracting device, text mining on a set of texts read out from the storage device;

a function of extracting, via the characteristic expression extracting device, characteristics of the set of texts of a designated category;

a function of discriminating, the associated classification axis discriminating device, from the plurality of classification axes, by each of the characteristics extracted by the characteristic expression extracting device, a classification axis that is strongly associated with whether or not the text contains the characteristic;

a function of discriminating, via the peculiar category discriminating device, the category of the classification axis discriminated by the associated classification axis discriminating device, which has the number of belonging texts largely diverted from a proper value considering the number of texts, by each of the categories of the classification axis in the entire set of the texts that contain the characteristics;

a function of relating, via the extraction result with peculiar category output device, characteristic extracted by the characteristic expression extracting device to the category discriminated by the peculiar category discriminating device;

a function of judging, via the extraction result with peculiar category output device, whether the characteristics appear in a specific citation in a deviated manner; and a function of outputting, via the extraction result with peculiar category output device, the characteristics and the specific citation in a corresponding manner when the characteristics appear in the specific citation in a deviated manner, and outputting the characteristics as not being related to the specific citation when there is no deviation to the specific citation in the text containing the characteristics.

* * * * *

UNITED STATES PATENT AND TRADEMARK OFFICE
CERTIFICATE OF CORRECTION

PATENT NO.        : 8,595,247 B2
APPLICATION NO.   : 12/227696
DATED             : November 26, 2013
INVENTOR(S)       : Takahiro Ikeda et al.

Page 1 of 1

It is certified that error appears in the above-identified patent and that said Letters Patent is hereby corrected as shown below:

ON THE TITLE PAGE:

Item (75) Inventors, "Kenjo Satoh" should read --Kenji Satoh--

Signed and Sealed this
Twenty-fourth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,595,247 B2  
APPLICATION NO. : 12/227696  
DATED : November 26, 2013  
INVENTOR(S) : Ikeda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 625 days.

Signed and Sealed this
Twenty-second Day of September, 2015

Michelle K. Lee
*Director of the United States Patent and Trademark Office*